US011900508B2

(12) United States Patent
Goodsitt et al.

(10) Patent No.: US 11,900,508 B2
(45) Date of Patent: Feb. 13, 2024

(54) AUGMENTED REALITY SYSTEM WITH COLOR-BASED FIDUCIAL MARKER UTILIZING LOCAL ADAPTIVE TECHNOLOGY

(71) Applicant: Capital One Services, LLC, McLean, VA (US)

(72) Inventors: Jeremy Edward Goodsitt, Champaign, IL (US); Austin Grant Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/121,648

(22) Filed: Mar. 15, 2023

(65) Prior Publication Data

US 2023/0290018 A1    Sep. 14, 2023

Related U.S. Application Data

(63) Continuation of application No. 17/462,552, filed on Aug. 31, 2021, now Pat. No. 11,631,203, which is a continuation of application No. 17/102,689, filed on Nov. 24, 2020, now Pat. No. 11,151,757, which is a continuation of application No. 16/708,899, filed on Dec. 10, 2019, now Pat. No. 10,878,600.

(51) Int. Cl.
*G06T 11/00* (2006.01)
*G06T 7/90* (2017.01)
*G06K 19/06* (2006.01)

(52) U.S. Cl.
CPC ...... *G06T 11/001* (2013.01); *G06K 19/06037* (2013.01); *G06T 7/90* (2017.01); *G06T 2207/10024* (2013.01); *G06T 2207/30204* (2013.01)

(58) Field of Classification Search
CPC .......................... G06T 11/001; G06T 19/006
See application file for complete search history.

(56) References Cited

U.S. PATENT DOCUMENTS

2008/0101693 A1* 5/2008 Young .................. G06V 10/242
382/165
2020/0226762 A1* 7/2020 Milovanovic ............. G06T 7/73

* cited by examiner

Primary Examiner — Shivang I Patel
(74) Attorney, Agent, or Firm — KDW Firm PLLC

(57) ABSTRACT

Techniques to improve operation of an augmented reality device and/or system utilizing fiducial markers and/or color space conversions are provided. In various embodiments, a color space of an object is altered based on a movement of the object in relation to an environment. The environment may include two or more segments with a distinct environment color space in relation to one another. The object may transition from one of the two or more environment segments into the other one of the two or more segments. The alteration is based on the transition from the color space of the one of the two or more environment segments into the other one of the two or more environment segments.

20 Claims, 21 Drawing Sheets

MATRIX CODE(S) 600A

MATRIX CODE(S) 600B

MATRIX CODE(S) 600C

800A

RECEIVE A REPRESENTATIVE DATASET OF THE SEGMENTS OF THE ENVIRONMENT
802

PROCESS THE REPRESENTATIVE DATASET INTO A HISTOGRAM
804

IDENTIFY A MOST PREVALENT PLURALITY OF COLORS ASSOCIATED WITH THE TARGET BASED ON THE HISTOGRAM
806

DETERMINE A RELATED PLURALITY OF COLORS BASED ON THE HISTOGRAM, INCLUDING AT LEAST ONE OF I) AN ABSENT COLOR IN RELATION TO THE SEGMENT AND II) AT LEAST ONE LEAST PREVALENT COLOR ASSOCIATED WITH THE SEGMENT
808

CREATE A MATRIX USING THE RELATED PLURALITY OF COLORS
810

DETECT A MATRIX ON DISPLAY IN AN ENVIRONMENT, WHERE THE MATRIX INCLUDES A PLURALITY OF NON-BLACK AND NON-WHITE COLORS, WHERE EACH ONE OF THE PLURALITY OF NON-BLACK AND NON-WHITE COLORS ARE AT LEAST ONE OF I) AN ABSENT COLOR IN RELATION TO A SEGMENT OF THE ENVIRONMENT AND II) AT LEAST ONE LEAST PREVALENT COLOR ASSOCIATED WITH THE SEGMENT OF THE ENVIRONMENT
*815*

TRANSMIT A RESULT OF THE DETECTION TO A COMPUTING DEVICE
*820*

> DETECT A MATRIX ON DISPLAY IN AN ENVIRONMENT, WHERE THE MATRIX INCLUDES A PLURALITY OF NON-BLACK AND NON-WHITE COLORS AND AT LEAST ONE OF AN ULTRAVIOLET LAYER AND AN INFRARED LAYER, WHERE EACH ONE OF THE PLURALITY OF NON-BLACK AND NON-WHITE COLORS ARE AT LEAST ONE OF I) AN ABSENT COLOR IN RELATION TO A SEGMENT OF THE ENVIRONMENT AND II) AT LEAST ONE LEAST PREVALENT COLOR ASSOCIATED WITH THE SEGMENT OF THE ENVIRONMENT
> *840*

> TRANSMIT A RESULT OF THE DETECTION TO A COMPUTING DEVICE
> *850*

DETECTING AN ALTERATION TO AT LEAST ONE FIDUCIAL MARKER ASSOCIATED WITH A SEGMENT OF AN ENVIRONMENT, WHEREIN THE AT LEAST ONE FIDUCIAL MARKER INCLUDES A PLURALITY OF NON-BLACK, NON-WHITE COLORS, AND NON-GREYSCALE COLORS, AND WHEREIN THE ALTERATION IS BASED ON A DETECTED CHANGE IN COLOR ASSOCIATED WITH THE ENVIRONMENT SEGMENT
*860*

UPDATING A MESH FOR AN AUGMENTED REALITY SYSTEM UTILIZING THE AT LEAST ONE ALTERED FIDUCIAL MARKER
*865*

```
DETECT AN ALTERATION TO A FIDUCIAL MARKER ON DISPLAY
OF A DEVICE, WHERE THE FIDUCIAL MARKER INCLUDES A
PLURALITY OF NON-BLACK AND NON-WHITE COLORS, WHERE
EACH ONE OF THE PLURALITY OF NON-BLACK AND NON-WHITE
COLORS ARE BASED ON A DETECTED CHANGE IN COLOR WITH
RESPECT TO A CHANGE IN LOCATION IN AN ENVIRONMENT,
AND WHEREIN EACH ONE OF THE NON-BLACK AND NON-WHITE
COLORS ARE BASED ON AT LEAST ONE OF I) AN ABSENT COLOR
IN RELATION TO THE CHANGED ENVIRONMENT LOCATION AND
II) AT LEAST ONE LEAST PREVALENT COLOR ASSOCIATED
WITH THE CHANGED LOCATION.
870
```

```
PERFORM A SPATIAL ORIENTATION OPERATION UPON
DETECTION
875
```

```
┌─────────────────────────────────────────────┐
│  UTILIZE ONE OR MORE FIDUCIAL MARKERS TO    │
│ LOCALIZE ONE OR MORE CAMERAS IN RELATION TO │
│     THE ONE OR MORE FIDUCIAL MARKERS        │
│                     880                     │
└─────────────────────────────────────────────┘
                      │
┌─────────────────────────────────────────────┐
│   UTILIZE DATA IN THE ONE OR MORE FIDUCIAL  │
│     MARKERS TO DETERMINE WHERE A MESH       │
│ ASSOCIATED WITH AN AUGMENTED REALITY DEVICE │
│  IS GENERATED IN RELATION TO THE ONE OR MORE│
│              FIDUCIAL MARKERS               │
│                     882                     │
└─────────────────────────────────────────────┘
                      │
┌─────────────────────────────────────────────┐
│  UTILIZE THE DATA IN THE TAG TO DETERMINE A │
│  ROTATION OR MOVEMENT OF AN OBJECT OR ENTITY│
│   IN AN ENVIRONMENT ASSOCIATED WITH THE     │
│          AUGMENTED REALITY SYSTEM           │
│                     884                     │
└─────────────────────────────────────────────┘
                      │
┌─────────────────────────────────────────────┐
│   GENERATE A MESH OF THE AUGMENTED REALITY  │
│         UTILIZING THE DETERMINATION         │
│                     886                     │
└─────────────────────────────────────────────┘
```

*FIG. 8G*

AUGMENTED REALITY SYSTEM WITH COLOR-BASED FIDUCIAL MARKER UTILIZING LOCAL ADAPTIVE TECHNOLOGY

RELATED APPLICATIONS

This application in a continuation of U.S. patent application Ser. No. 17/462,552, filed Aug. 31, 2021, which is a continuation of U.S. patent application Ser. No. 17/102,689, filed Nov. 24, 2020, which is a continuation of U.S. patent application Ser. No. 16/708,899 (now U.S. Pat. No. 10,878,600), filed Dec. 10, 2019. The contents of the aforementioned applications are incorporated herein by reference in their entirety.

TECHNICAL FIELD

Embodiments herein generally relate to computing systems, and more specifically, to augmented reality systems with color-based fiducial markers utilizing local adaptive technology.

BACKGROUND

Certain materials (e.g., paint, ink, and/or the like) have been used to memorialize scenes and/or objects into semi-permanent to permanent mediums. Computer technologies allow for digitization and detections of these images embedded on these mediums and have introduced image processing as a technical field. Detection of images and revealing information associated therewith constitutes at least one aspect of image processing and have applications in a number of cases.

It is with respect to these and other considerations that the present improvements have been needed.

SUMMARY

Embodiments disclosed herein provide systems, methods, articles of manufacture, and computer-readable media to improve operation of an augmented reality device and/or system utilizing fiducial markers and/or color space conversions. In various embodiments, a color space of an object is altered based on a movement of the object in relation to an environment. The environment may include two or more segments with a distinct environment color space in relation to one another. The object may transition from one of the two or more environment segments into the other one of the two or more segments. The alteration may be based on the transition from the color space of the one of the two or more environment segments into the other one of the two or more environment segments.

BRIEF DESCRIPTION OF THE DRAWINGS

FIGS. 8A-8I illustrate embodiments of logic flows.

DETAILED DESCRIPTION

Figure 1:
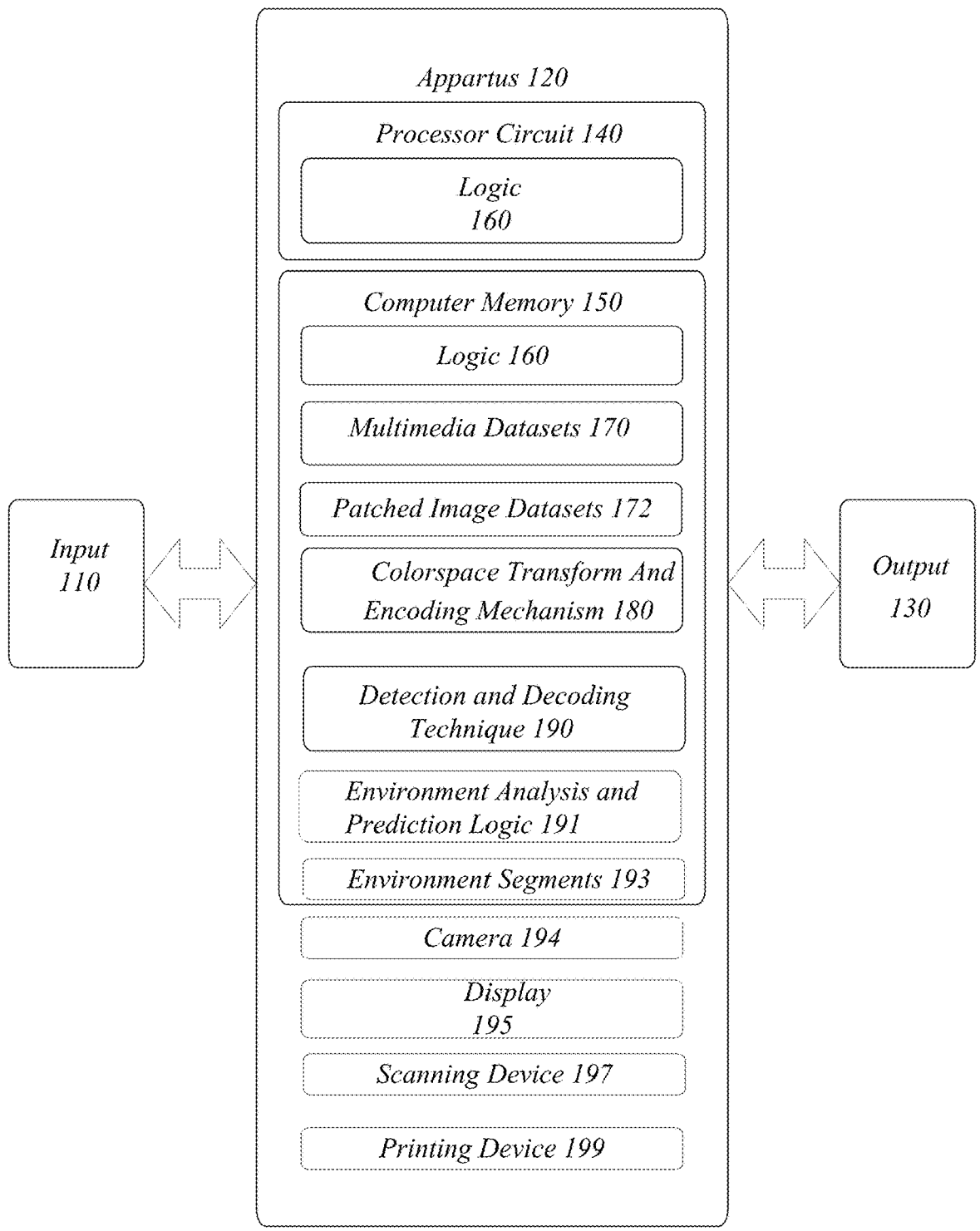
FIG. 1 illustrates an embodiment of a system that provides color-based fiducial markers utilizing local adaptive technology.

Embodiments disclosed herein provide techniques to determine the most appropriate color space model to use such that an object (such as a colored marker) may be detected in an environment as the object moves within the environment. Generally, as the colored marker moves in the environment, embodiments disclosed herein may monitor the current position of the colored marker and predict the most likely future movement of the colored marker. To allow the colored marker to maintain information that can be read by a scanning device (e.g., a camera), the most appropriate colors may be determined for the current and/or predicted future movement of the colored marker. Doing so may maintain the orthogonality to a dataset being represented by the colored marker as well as any transformations thereto.

In one embodiment, given a specified radius around the colored marker, a system may update the color space of the colored marker continuously (e.g., according to periodic timing intervals) and/or responsive to user input. The environment may be divided into a plurality of segments (e.g., grid and/or an octree for multi-camera setups) relative to one or more colors each camera monitoring the environment can see (or detect). For each segment (e.g., a box and/or a color region), the color transformations may be predetermined. When the colored marker is within a segment of the environment, the colored marker is given the predetermined color transformation specified by the segment of the environment. As the colored marker moves to a different segment of the environment, a linear transform may be applied between the colors to smooth the transition between colors.

Often, when a colored camera marker (e.g., for an augmented reality system) moves within an environment (e.g., a room), it may be more difficult for cameras to detect the colored marker depending on the colors around the colored marker in the environment. Advantageously, rather than adjusting once for the entire environment, embodiments disclosed herein perform color space modifications locally around the colored marker and continuously do so as the camera and/or the marker moves around the environment.

Although the augmented reality context is provided as an example of the utility of one or more embodiments of the present disclosure, color space conversion can improve object detection in different contexts, including detection and navigation activity in real-world settings, and other applications where utilizing a color space conversion is useful. Furthermore, although the present disclosure provides for various color space conversion techniques, any color space conversion, including black, white, and grey-scale conversions, in addition to non-black, non-white, and non-grey-scale conversions, can be used consistent with one or more embodiments as disclosed herein.

Various embodiments improve image processing by identifying which color space model is most appropriate to use for detection in a particular environment, e.g., to convert between color space(s) to improve detection within particular environments and/or in association with particular targets as the targets move through the environment. In various embodiments, the conversion between color space(s) provides for a matrix located on an object or displayed by an electronic device, where the matrix is optimized for detection in an environment by performing one or more color space conversions in generating the matrix. In one or more embodiments, the matrix is a matrix barcode, and in one or more embodiments, the matrix barcode is a fiducial marker.

In various embodiments, the color space conversion encodes information with respect to a matrix barcode, which permits proper scanning of the object associated with the matrix barcode, while preventing tampering and false verifications, e.g., the color channels containing the information are tied to the conversion, and without having a scanning device accessing information related to the conversion, the scan cannot verify the object associated with the object and/or access any information associated therewith.

In various embodiments, a color space conversion provides for increasing the amount of information stored on the matrix, e.g., matrix barcode, as the color channels associated with the converted-to (derivative) color space can be increased as needed, without any limitation (provided the scanning equipment is suitably configured to make detections when the matrix is scanned).

In various embodiments, a computer device, such as a laptop, cellphone, tablet, or any other suitable device may generate an image depicting a colored marker before or after an initial color space conversion. As the colored marker moves within the environment, a change may occur such that the colored marker may be more optimally displayed for detection in the environment if one or more color space conversions are performed on the colored marker. The computer device may perform the relevant color space conversions and display an altered colored marker when the position of the colored marker in the environment changes, where the color space conversions are optimized in relation to the current and/or predicted position of the colored marker in the environment. The computing device may be configured to continually sample images and/or other data associated with the environment to detect additional changes, and in response to those changes, continually optimize the displayed image including the colored marker utilizing additional color space conversions and techniques. In various embodiments, the displayed image may be a matrix barcode, a barcode, a fiducial marker, etc. Accordingly, one or more embodiments disclosed herein, in addition to other benefits outlined and described herein, a computer device offers the ability to dynamically improve detection of a displayed images by detecting changes in the position of a colored marker in the associated environment (containing or associated with the displayed image) and altering the colored marker in response to the changes in position according to one or more color space conversion techniques.

In various embodiments, the color space conversions improve edge detection. In image processing, edge detection is a known technical field and techniques for edge detection provide different results for different color space models. It is not unusual for one color space model to provide better results over another color space in edge detection because having image data in accordance with the color space model has a higher likelihood of success in edge detection than the other color space model.

Color space models are configured to represent color data, but most models differ in their representation of that color data. For instance, the CIELAB or LAB color space model represents the color as three values: L for the Luminance/Lightness and Alpha (A) and Beta (B) for the green-red and blue-yellow color components, respectively. The LAB color space model is typically used when converting from a Red-Green-Blue (RGB) color space model into Cyan-Magenta-Yellow-Black (CMYK). For some images, representing its color data in the LAB color space model provides better edge detection results than other color space models, including the RGB model. As a result, the embodiments can improve affordability, scalability, modularity, extendibility, or interoperability for an operator, device or network that utilizes image detection by providing a more effective and accurate manner of scanning an image including a colored marker (and by extension, minimizing redundant consumption of computer resources).

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1 illustrates a block diagram for a system 100. Although the system 100 shown in FIG. 1 has a limited number of elements in a certain topology; it may be appreciated that the system 100 may include more or fewer elements in alternate topologies as desired for a given implementation. The system 100 may implement some or all of the structure and/or operations for the system 100 in a single computing entity, such as entirely within a single device.

The system 100 may comprise an apparatus 120. The apparatus 120 may be generally arranged to process input 110 using various components and generate output 130 of which at least some output 130 is displayed on a display device or printed on a suitable material surface. The apparatus 120 may comprise a processor circuit 140 and computer memory 150. The processor circuit 140 may be any type of logic circuit and the computer memory 150 may be a configuration of one or more memory units.

The apparatus 120 further includes logic 160 stored in the computer memory 150 and executed on the processor circuit 140. The logic 160 is operative to cause the processor circuit 140 to process (e.g., encode) image data of multimedia datasets 170 (which may include images and/or videos) into patched image datasets 172 where the image data is according to one or more color spaces and/or color space conversions using a color space transform and encoding mechanism 180. The multimedia datasets 172 may include one or more images depicting an environment (e.g., to be used to generate the environment segments 193). The color space model, as described herein refers to any suitable color space model, such as Red-Green-Blue (RGB), Cyan-Magenta-Yellow-Black (CMYK), Luminance-Alpha-Beta (LAB), and/or the like, where each channel in the model can represent a bit of data. For example, the Alpha and Beta channels of the LAB color space model refer to green-red and blue-yellow color components, respectively. The green-red component may represent a variance between red and green with green in the negative direction and red in the positive direction along an axis and the blue-yellow component may represent a variance between blue and yellow with blue in the negative direction and yellow in the positive direction along an axis. In various embodiments, an edge may be defined (mathematically) as each pixel location where the Alpha channel has a value of zero (0) or near zero. In various embodiments, a predefined range of values associated with each color channel, e.g., a color value of a color associated with the color channel, may represent a first bit value, e.g., "1," and a second range of values may represent a second bit value, e.g., a "0," from an encoding scheme perspective. As such, as the number of color channels is increased, the overall encoding capacity may increase as well.

In various embodiments, the patched image data includes a plurality of patches of which each patch comprises color data (e.g., pixel data where each pixel is represented as a tuple of Red-Green-Blue (RGB) color intensities). As described herein, one color space model (e.g., RGB) may correspond to a higher likelihood of success in edge detection than another color space model. Some images provide optimal or near-optimal edge detection results when arranged in RGB while other images provide optimal or near-optimal edge detection results when arranged in LAB or an XYZ color space and vice versa.

In various embodiments, the logic 160 is further operative to cause the processor circuit 140 to apply the color space transform mechanism 180 to the image data to generate the transformed image data in accordance with the other color space model. Then, the logic 160 is operative to cause the processor circuit 140 to apply an edge detection and decoding mechanism 190 to the transformed image data. The detection and decoding mechanism 190 is an image processing technique that refers to any one of a number of algorithms for identifying edges or boundaries of objects within images and/or decoding data stored therein. In general, the edge detection technique 190 provides information (e.g., pixel data) indicating positions of edges in the image data of the multimedia datasets 170. Some implementations of the edge detection technique 190 operate by detecting discontinuities in brightness and, for those implementations, having the image data in a LAB color space, or XYZ color space over RGB provides more precise edge detection results. Some implementations of the edge detection technique 190 provide accurate edge detection results when the image data is modeled according to HCL (Hue-Chroma-Luminance) instead of RGB.

In various embodiments, the logic 160 is further operative to cause the processor circuit 140 to identify an image group corresponding to the patched image data. The multimedia datasets 170 further includes image group model data correlating images with a color space model most likely to provide appropriate edge detection results. In various embodiments, the image group model data indicates which color space model to use in transforming a given image prior to edge detection to achieve near-optimal edge detection results. The logic 160 is further configured to cause the processor circuit 140 to select a color space transform mechanism 180 based upon the image group. The color space transform mechanism 180 is operative to transform the image data into transformed image data in accordance with another color space model, the other color space model having a higher likelihood than the color space model at edge detection for the image group. It is appreciated that the other color space model may be any color space model, including those with a different number of channels than the color space model.

In various embodiments, the logic 160 can be further operative to cause the processor circuit 140 to determine a color space that is optimal for detection in association with a particular object, entity, or environment, where a color space or histogram representation of the particular object, entity or environment can be part of the multimedia datasets 170. The logic 160 can be further operative to cause the processor circuit 140 to determine the optimal color space based on one or more color space conversion operations, where the color space conversion operations can provide a mechanism for encoding information in any suitable medium, including but not limited to a matrix, such as a matrix barcode, a fiducial marker, any other suitable barcode, or any other suitable image. The logic 160 can be further operative to cause the processor circuit 140 to generate a scheme for a matrix, e.g., a matrix barcode, fiducial marker, etc. based on the color space determination and for detection in relation to the particular object, entity, or environment. The logic 160 can further be operative to cause the processor circuit 140 to provide for a scheme to add at least one ultraviolet layer and infrared layer to an image, such as a matrix or matrix barcode, useful for detection in relation to the particular object, entity, or environment, where the ultraviolet layer and/or infrared layer add additional data carrying capacity and/or security to the detectable image.

The one or more color space models as described herein, as stated and implied elsewhere herein, refers to any suitable color space model, such as color space employing a tristimulus system or scheme, the Red-Green-Blue (RGB), the Luminance-Alpha-Beta (LAB), an XYZ color space, and/or the like and/or variations of the same. Similarly, although various embodiments may refer to a particular conversion from one specific color space to another specific color space, conversions between other color spaces are contemplated and consistent with the teachings of the present disclosure.

In various embodiments, as described herein, one color space model (e.g., RGB or XYZ) may correspond to a higher likelihood of success in edge detection than another color space model in terms of detection of a displayed or printed image, e.g., barcode, in relation to an object, entity, or environment with a particular color distribution. Moreover, particular colors and color channels associated with a color space may offer superior edge detection in relation to the object, entity, or environment. Some images provide optimal or near-optimal edge detection results when arranged in RGB while other images provide optimal or near-optimal edge detection results when arranged in XYZ or LAB and vice versa. By way of example, an image depicting a red balloon on a green field would appear much different in RGB than in LAB; therefore, with respect to edge detection, LAB would provide a higher likelihood than RGB at successfully identifying and locating edges (e.g., boundaries) of the red balloon, or a matrix, e.g., barcode or fiducial marker, that had a red color in the green environment.

In various embodiments, a color space is associated with one or more color channels, with various examples of color channels in relation to individual color spaces being provided for above and elsewhere herein. In various embodiments, a color channel is a distribution of colors with a first color and second color of first and second highest prevalence, respectively, where the first color becomes a minimum in the color channel and the second color becomes the maximum such that the boundary may be a transition between these colors, where this minimum and maximum scheme may be with respect to a color space that is converted thereto from another color space, e.g., a second color space part of a color space conversion from a first color space. This boundary may be at least one pixel where the color changed from the first to the second color or vice versa. If the first color is set to zero (0) and the second color is set to two hundred and fifty-five (255), then, mathematically, this boundary may be located at pixel(s), light components, or other physical manifestations reflecting of values that jumped between the minimum and maximum color value; for example, there may be sharp division (i.e., thin boundary) in which at least two (or portions of) signal representations, or other physical manifestations reflecting the light transition immediately between 0 and 255. In various embodiments, as alluded to above, a range of values within a color channel may constitute a bit value of "1," e.g., 128-255, and a range of values within a color channel may constitute a bit value of "0", e.g., 0-127. In various embodiments, color channels, e.g., "R," "G," and "B" define a color space such as RGB (e.g., a first color space based on a tristimulus system), and in various embodiments custom color channels can be created using a (second) tristimulus system associated with and defining an XYZ (second, e.g., converted-to, color space).

In various embodiments, as discussed herein, one or more color channel ranges are selected such that a maximum color value of one or more color channel corresponds to a unique color value, most prevalent color value, and/or highest color value of a target object, entity, and/or environment associated with a scan and the minimum color value of the color channel corresponds to a most unique color, most prevalent color value and/or highest color value of the scannable image, e.g., matrix, matrix barcode, and/or fiducial marker, where additionally, the most prevalent value and/or highest color value of the scannable image is also a least prevalent (lowest color value) and/or absent from the target object, entity, and/or environment associated with the scan, or visa-versa (e.g., with respect to the maximum or minimum values).

In various embodiments, as described herein, particular objects, entities, or environments may have color distributions that make more complicated and varied color spaces, and colors and color channels associated therewith, including colors imperceptible by the human eye, more attractive for detection, in addition to increasing capacity for storage and encryption of information. As such, in various embodiments, the logic 160 is further operative to cause the processor circuit 140 to identify an image group corresponding to the patched image data. The multimedia datasets 170 further includes image group model data correlating images with a color space transform model most likely to provide appropriate edge detection results. In some embodiments, the image group model data indicates which color space transform model to use in transforming a given image prior to edge detection in order to achieve near-optimal edge detection results. The logic 160 is further configured to cause the processor circuit 140 to select a color space transform mechanism 180 based upon the image group. The color space transform mechanism 180 is operative to transform the image data into transformed image data in accordance with another color space model, the other color space model having a higher likelihood than the color space model at edge detection for the image group.

In various embodiments, the system 100 can include one or more of a camera 194 and/or one or more of a scanning device 197, where both camera 194 and device 197 can be any suitable device for obtaining, capturing, editing, and/or scanning images, including but not limited to video or camera pictures, of objects, entities, and/or environments. In various embodiments, the system 100 can include a display 195. The logic 160 can be configured to capture or scan images of a particular object, entity or environment using camera 194 and/or device 197, where the captured images can become part of multimedia datasets 170 and used for determining suitable color spaces, performing color space conversions, and/or scanning images determined from color space conversions, as may be consistent with the teachings provided herein.

In various embodiments, the system 100 can include a printing device 199 (e.g., printer) or an application for the same, where images part of multimedia datasets 170 and/or images generated by one or more components of system 100, by applying a color space transformation technique or mechanism, such as a scannable matrix, matrix barcode, or fiducial marker can be printed by printing device 199 and/or printing device 199 can provide a scheme for another device to print or generate an image in association with the scannable matrix, matrix barcode, or fiducial marker.

In various embodiments, the logic 160 may be configured to instruct one or more of the camera 194 and/or scanning device 197 to continuously scan an object, entity, or environment that is associated with an initial image displayed on display 195, where the displayed image may be an initial matrix, a matrix barcode, and/or a fiducial marker that is created using one or more techniques as outlined herein, including using the image processing, image generation, and/or color space conversion techniques as discussed herein, and/or any other suitable image processing technique and/or color space conversion technique. Alternatively, the displayed image may be a matrix, matrix barcode, and/or fiducial marker that is displayed without an associated color space conversion technique, e.g., the logic 160 or other suitable component instructs the display 195 to display an initial image, e.g., matrix, matrix barcode, and/or fiducial marker without, initially, considering an associated entity, environment, or object associated with the displayed image. In various embodiments, the initial or first displayed image is a matrix, matrix barcode, and/or fiducial marker that is colored, e.g., not black, white, or based on a greyscale.

In various embodiments, whether the initial displayed image was associated with an optimization technique or not, the logic 160 causes the processor circuit 140 to instruct one or more of the camera 194 and/or scanning device 197 to detect a change to an object (and/or a change in a position of the object), entity, or environment associated with the display 195, wherein various embodiments the detection is with respect to an environment associated with the display 195 and the displayed image of the display, e.g., a matrix, matrix barcode, and/or fiducial marker. For example, the logic 160 may cause the processor circuit 140 to instruct the camera 194 and/or scanning device 197 to continually scan the color distribution of the environment to detect a change in the color distribution or color space associated therewith, e.g., if the environment changes a lighting scheme, a change in shades occurs as a result of changes in time, new items are introduced into the environment that impacts the shadow profile and/or otherwise alters the color space distribution, new colors are applied in the environment (e.g., walls are painted a new color), or any other suitable change (e.g., a change in a location of an object) that produces a color space change. In various embodiments, once the change in the object, entity or environment is scanned, and optimal-color space is determined in relation to the object, entity, or environment, where the optimal-color space can refer to optimization in relation to detecting a displayed image in association with the entity, environment, or object. The color space optimization may be any (or may utilize) any suitable optimization, image processing technique, and/or image processing system, including but not limited to an embodiment directed to color space optimization as discussed herein. In various embodiments, once the optimal color space is determined, then the logic 160 may cause the processor circuit 140 to configure the display 195 to alter the displayed image in accordance with the optimal color space, e.g., a new matrix, matrix barcode, and/or fiducial marker is displayed on display 195 such that it has a color space distribution (e.g., the colors making up the image) are optimized for scanning, e.g., by the scanning device 197, or any other suitable component, in relation to the environment where a scan may take place (or an object or entity associated with a scan). Accordingly, in various embodiments, the alteration to the displayed image enhances the ability of the displayed image to be detected in relation to an object, entity, or environment where a scan may take place.

Figure 3:
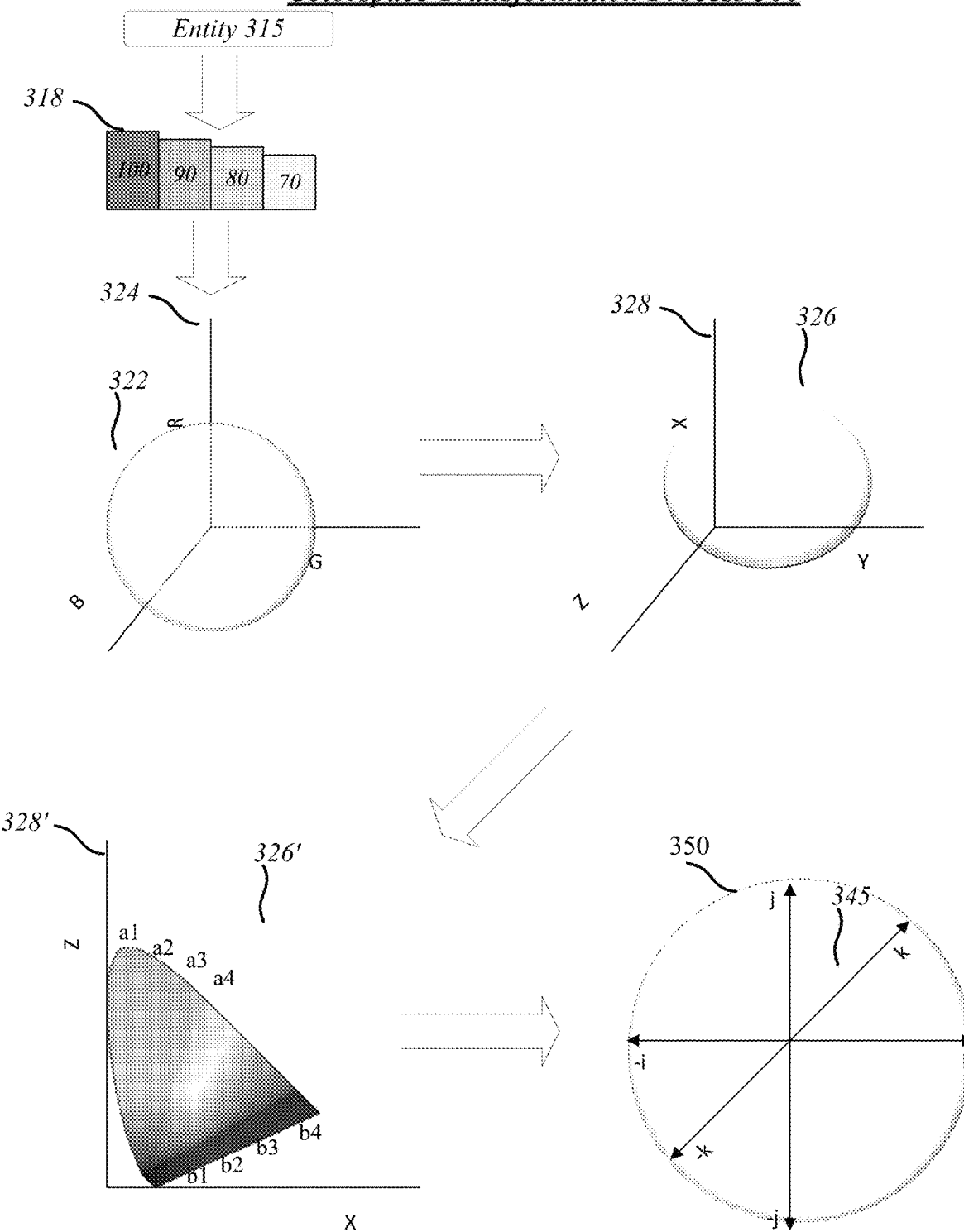
FIG. 3 illustrates an embodiment of color space conversion.

In various embodiments, a representative dataset that can be used to determine an optimal color space from an associated object, entity, or environment, may be obtained by the logic 160 causing the processor circuit 140 to instruct the scanner 197 and/or camera 194 to take one or images and/or videos of the changed object, environment, and/or entity, and construct a dataset for color space optimization (e.g., pursuant to the technique of FIG. 3 by way of non-limiting example). As discussed in greater detail herein, the color space optimization technique, as utilized by logic 160 in relation to FIG. 1 or as utilized by any other suitable component described herein, may include processing the representative dataset into a histogram representative of the changed environment, object, or entity, identify a most prevalent plurality of colors associated with the changing environment based on the histogram, and determine a related plurality of colors based on the histogram, where the related plurality of colors include at least one of i) an absent color in relation to the changed object, entity, environment, or environment segment 193, and ii) at least one least prevalent color associated with the changed object, entity, environment, or environment segment 193. Thereafter, the logic 160 (or any other suitable component) may cause the processor circuit 140 to instruct the display 195 to display an altered version of the displayed image based on the related plurality of colors, e.g., an altered matrix, matrix barcode, and/or fiducial marker reflects one or more colors that are the related plurality of colors.

In various embodiments, as outlined herein, a tristimulus system and/or an RGB color space may be used in whole or in part to determine the optimal color space associated with the changing colors of the environment, entity, or object associated with the displayed image to be detected or scanned. In various embodiments, the changing environment may be mapped according to an RGB color space, initially, and then one or more color space conversions may occur concerning the mapped RGB color space, including a conversion to another color space, e.g., an XYZ color space and/or an XYZ color space containing a luminance channel. In various embodiments logic 160 may cause the processor (based on the histogram and received dataset associated with the changing environment, entirety, or object) to determine at least one set of color coordinates for each one of the most prevalent colors according to the another color space and determining at least one set of color coordinates corresponding to the relate, colors according to the another color space, wherein various embodiments, the at least one set of coordinates of the most prevalent plurality of colors being perpendicular or orthogonal, with respect to the another color space (e.g., XYZ), to the at least one set of coordinates of the related plurality of colors. In various embodiments, the filtering of the luminance channel, e.g., if the another color space is an XYZ color space with a luminance channel, is done to obtain all of the color-coordinates associated with the conversion.

In various embodiments, the logic 160 may be configured to instruct the processor circuit 140 to determine a range of additional colors ((based on the histogram and/or a received dataset associated with the changed environment, entirety, or object), including one or more colors in between the related plurality of colors and the most prevalent colors associated with the altered entity, object, and/or environment, and the processor 140 to instruct the display 195 alter the displayed colored matrix code based on the determined optimal color space is further caused to: instruct the display device to display the altered matrix based on both the related plurality of colors and the additional plurality of colors, wherein the first matrix code is a fiducial marker and the altered matrix code is a fiducial marker.

The environment analysis and prediction logic 191 is configured to partition an environment (e.g., a room, floor of a building, outdoor area, etc.) into a plurality of environment segments 193. The environment segments 193 may be generated by the logic 191 based on one or more images depicting the environment (e.g., images of the environment captured by the cameras 194 and/or scanner 197). For example, an image of the environment may be partitioned into 4, 8, 16, or any number of segments 193. In some embodiments, the environment may be partitioned into segments 193 based on the colors in the environment such that an object, e.g., a matrix, matrix barcode, and/or fiducial marker displayed in the environment may be optimally visible and/or detected.

For each segment 193 of the environment, the various components of the apparatus 120 may determine an optimal color space according to the techniques described herein. Doing so allows an object, e.g., a matrix, matrix barcode, and/or fiducial marker displayed to be colored according to the optimal color space associated with each segment 193. For example, an object may be displayed in a first segment 193 of an environment having an associated first optimal color space. The first segment 193 may be, for example, a portion of a room that is near a window and is therefore brighter than a second segment 193 of the room which is not near a window. The optimal color spaces of the first and second segments 193 may be distinct.

When the object is positioned (or displayed) in the first segment 193 of the room, the object may be altered to have the optimal color space associated with the first segment 193. Advantageously, the environment analysis and prediction logic 191 may monitor the movement of the object in the environment to determine that the object is moving in real time. The real-time movement may cause the object to be positioned in the second segment 193 of the room. As such, the color space of the object may be altered according to the optimal color space of the second segment 193 of the room. Doing so improves the visibility and detection of the object by devices in the environment (e.g., the camera 194, scanning device 197, apparatus 120, etc.). In some embodiments, a linear transform may be applied to smooth the transformation of the color space of the object from the color space of the first segment 193 to the color space of the second segment 193.

In some embodiments, the environment analysis and prediction logic 191 may predict the future movement of the object in the environment. For example, the environment analysis and prediction logic 191 may predict the movement of the object from the first segment 193 to the second segment 193. In such an example, the environment analysis and prediction logic 191 may cause the color space of the object to be altered based on the predicted movement to the second segment 193. Further still, in some embodiments, the environment analysis and prediction logic 191 may predict the optimal color space of one or more segments 193 according to the color space optimization techniques described herein.

In one embodiment, environment analysis and prediction logic 191 may receive a predefined radius. The radius may define a radius around the object to be monitored. In such embodiments, the environment analysis and prediction logic 191 may update the color space of the object based on the optimal color spaces defined by one or more segments 193 within the predefined radius around the object.

The segments 193 may be represented by any suitable data structure. In 2-dimensional embodiments, a grid structure may be used to define the segments 193. In 3-dimensional embodiments (e.g., where multiple cameras 194 are available to capture images of an environment), an octree (or quadtree) structure may be used. An octree is a tree data structure in which each internal node has eight child nodes. In such examples, therefore, the octree may recursively subdivide the 3-dimensional environment into eight octants. Each octant may be associated with a 3-dimensional point in the environment and an optimal color space transformation determined according to the techniques disclosed herein.

Figure 2:
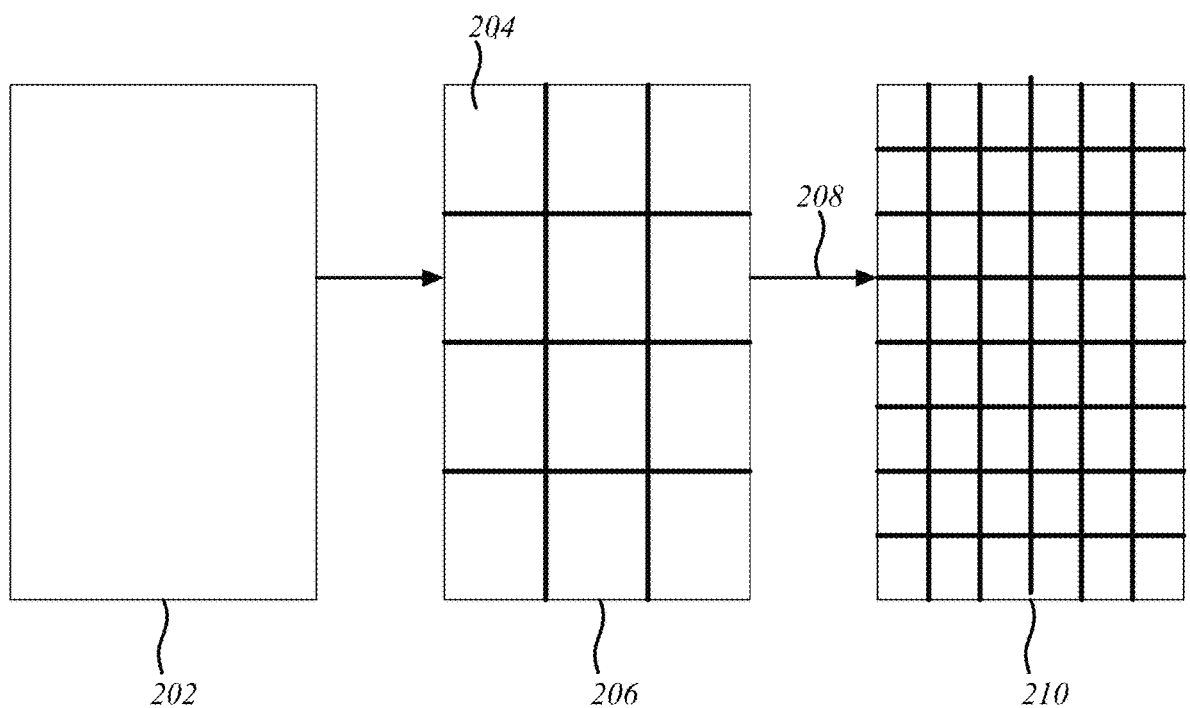
FIG. 2 illustrates an embodiment of a clustering process.

FIG. 2 illustrates an embodiment of a clustering process 200 for the system 100. The clustering process 200 operates on image datasets (e.g., the data sets 170, and/or 172 of FIG. 1) storing color data for images.

In some embodiments of the clustering process 200, color data 202 of an image undergoes a patching operation where the image is processed into a plurality of patches 204 of patched image data 206. Each patch 204 of the patched image data 206 includes color data in accordance with a color space model, such as pixel data having RGB tuples, where the pixel may represent an encoded representation of multimedia data. The clustering process 200 further processes the patched image data 206, via a transformation operation 208, by applying a color space transform mechanism on the color data of the patched image 206 to transform patched image data into transformed image data of a transformed image 210, where the transformed image may also represent an encoded representation of multimedia data. The color data of the patched image 206 is configured in accordance with the color space model and new color data for the transformed image 210 is generated according to another color space model.

In some embodiments, the clustering process 200 performs a mini-color space transform for at least one patch of the patched image 206, possibly leaving one or more patches without a transformation. Via the transformation operation 208, the mini-color space transform modifies the color data in the at least one patch to transform patched image data into transformed image data of a transformed image 210. The clustering process 200 may perform stitching between patches to make the patched image 206 uniform as opposed to creating artificial edges.

FIG. 3 illustrates an example of a color space conversion scheme 300 in accordance with various embodiments of the present disclosure. Although embodiments of the conversion scheme 300 may be described according to an entire environment 315, the conversion scheme 300 may be performed for each segment 193 of the environment 315. A histogram 318 representation of a particular environment 315 is provided (where the numbers 100, 90, 80, and 70 are intended to represent a simplified version of colors distribution values of one or more colors representing the particular object, entity, environment 315, and or segment 193 of the environment 315). The histogram 318 can be generated by having one or more components of system 100 performing a scan of the environment 315 and generating a histogram 318 of the most prevalent colors, least prevalent colors, or absent colors of the environment 315 and/or segments 193 thereof. In one or more embodiments, the histogram 318 can be of four, six, or eight colors. Since various embodiments of the present disclosure expressly contemplate using colors imperceptible to the human eye, there is no limitation on the number of colors that can be used with respect to the histogram 318, the color space conversions discussed herein, or any images generated from the color space conversions, including but not limited to a matrix, matrix barcode, fiducial marker, etc. can have in excess of four colors, six color, or eight colors, and four color channels, six color channels, or eight color channels, where the colors and/or color channels are distinct and different with respect to one another.

In various embodiments, one or more components of system 100 can determine the most prevalent colors associated with each segment 193 of the environment 315, and the resulting histogram 318 may be based on that determination. The histogram 318 can be used to map the most prevalent colors of each segment 193 to a distribution 322 associated with a suitable color space 324, including but not limited to an RGB color space 324. In various embodiments, the colors of histogram 318 of each segment 193 are mapped pursuant to the tristimulus values of the RGB color space, e.g., "R," "G," and "B." Any suitable mathematical conversion, e.g., linear-algebraic, etc. can be used to map the conversion to the RGB color space, e.g., convert the mapped RGB color space to another color space.

In various embodiments, the color channels of distribution 322 may represent one or more bits of data for an encoded representation of data, e.g., multimedia data, where the data may be compressed or un-compressed.

In various embodiments, once the distribution 322 is mapped according to the RGB color space 324, one or more components of system 100 can convert the RGB distribution 322 of each segment 193 to a new color space 326 with a distribution 328 pursuant to the new color space 326. Any suitable color space conversion can be used, including converting to an XYZ color space, where the conversion can be pursuant to any suitable mathematical conversions and equations that govern the XYZ color space, including suitable tristimulus conversions between RGB and XYZ. In various embodiments, "Y" represents a luminance value of the XYZ space and at least one of "X" and "Z" (or both) represent a chrominance value of the color space and an associated distribution, e.g., 326 plotted pursuant to the XYZ color space.

In various embodiments, the luminance channel "Y" is filtered out resulting in color space 328' and distribution 326', which can assist in making determinations solely on actual chromatic values associated with the entity, object, environment 315, and/or segment 193 of the environment 315 without considering luminance (this is helpful at least because colors can be used that are imperceptible to the human eye). In various embodiments, four (or more) lines can be defined by points (a1, b1), (a2, b2), (a3, b3), and (a4, b4), and are selected to have a maximum distance apart with respect to distribution 326'. In various embodiments, the points a1, a2, a3, and a4 are selected to correspond to the most prevalent colors associated with entity, object, or environment 315 and b1, b2, b3, and b4 by extension, being opposite to those colors, may represent the least prevalent or absent colors in association with entity, object, or environment b1, b2, b3, b4. These lines may define vectors for a new color space conversion in an XYZ or other suitable color space 345 and may form the basis for new XYZ tristimulus values.

An image, such as a matrix or matrix barcode, can be made using colors associated with the new color space 350 and a distribution 345 of colors defined by color channel vectors (i,−i), (j, −j), (k, −k), an additional color channel and all other color channels (omitted from display due to the limitations of three-dimensional space) associated therewith. In various embodiments, since the colors may correspond to less prevalent or absent colors in relation to where a potential scan may occur (or what is being scanned), e.g., a matrix barcode on an entity or object and/or in an environment with colors that have a maximum difference in relation thereto, edge detection is enhanced.

Alternatively, although not expressly shown, the maximum distance from the most prevalent colors to least prevalent colors can be determined, e.g., a1 to b1, a2 to b2, etc., and then lines can be drawn from b1, b2, b3, and b4 in a direction tangential, parallel or opposite a vector or direction associated with a1, a2, a3, and a4. The color channel vectors (i,−i), (j, −j), (k, −k), an additional color channel and all other color channels (omitted from display due to the limitations of three-dimensional space) associated with color space 350 may be entirely colors absent and/or mildly prevalent in relation to entity, object, environment 315, and/or segment 193 of the environment 315, which can further enhance edge detection.

In various embodiments, when performing the color space conversion between 328' and 350, in addition to carrying out the algebraic or other suitable conversions associated with the XYZ color space (or subsequent color spaces as may be necessary, e.g., LAB), the color channel vectors, e.g., (i,−i), (j, −j), (k, −k), may be orthogonal to one another by performing any suitable mathematical and/or orientation operation on the vectors and/or by selecting suitable points on color space 328' and distribution 326' when making the conversion. In various embodiments, a second maximum difference between one or more points can be taken in space 350, in addition to an orientation operation to center the distribution 345 along the axis of the newly defined color channel vectors, e.g., (i,−i), (j, −j), (k, −k), such that the color channel vectors are orthogonal and have a maximum distance in relation to one another. In various embodiments, performing at least one of the orthogonality operation, maximum determination, and/or orienting operation can further enhance edge detection of an image generated for scanning, such as a matrix barcode, in relation to an entity, object, or environment 315 (or segment 193 thereof) to be scanned.

In various embodiments, the various color channels described above, including each vector, e.g., (−i, i), defines a first color that is a minimum in the color channel and the second color becomes the maximum. This boundary may be at least one pixel where the color changed from the first to the second color or vice versa. If the first color is set to zero (0) and the second color is set to two hundred and fifty-five (255), then, mathematically, this boundary may be located at pixel(s) that jumped between the minimum and maximum value; for example, there may be sharp division (i.e., thin boundary) in which at least two neighboring pixels transition immediately between 0 and 255. In various embodiments, the boundary is such it may be a transition between these colors where, as discussed above, one or more color channel ranges are selected such that a maximum color value of one or more color channel corresponds to a unique color value, most prevalent color value, and/or highest color value of a target object, entity, environment, and/or segment of the environment associated with a scan and the minimum color value of the color channel corresponds to a most unique color, most prevalent color value and/or highest color value of the scannable image, e.g., matrix, matrix barcode, and/or fiducial marker, where additionally, the most prevalent value and/or highest color value of the scannable image is also a least prevalent (lowest color value) and/or absent from the target object, entity, and/or environment associated with the scan, or visa-versa (e.g., with respect to the maximum or minimum values).

The length of the color channel can be adjusted accordingly based on the capabilities of the scanning and image-acquiring abilities of the various components, e.g., camera or video device 194, scanning device 197, and/or recognition component 522-4 (discussed below with respect to FIG. 5), where the length increases the number of different colors between the minimum and maximum point of the color channel.

In various embodiments, one or more additional color space conversions can be performed at any point after a first optimization (e.g., maximum/minimum determination has been made) with the conversion corresponding to the XYZ coordinates, including converting to a LAB color space using any suitable mathematical conversion for converting XYZ coordinates to LAB coordinates. In various embodiments, since optimization is associated with the XYZ coordinates and space (e.g., based on the color space conversion), the optimization translates to the LAB coordinates and space. In various embodiments, the additional conversion can occur before or after the filtration of the luminance channel (as discussed herein).

In various embodiments, the conversions between the RGB color space to the XYZ color space and/or a first converted-to (derivative) XYZ space to another XYZ color space can be governed by the tristimulus equations (Equation 1 below) that define the converted color space and a distribution of color space, where the value of x+y=z can be normalized to 1.

$$x=X/(X+Y+Z),$$

$$y=Y/(X+Y+Z),$$

$$z=Z/(X+Y+Z). \quad \text{Equation 1.}$$

In various embodiments, the value of "X," "Y," and "Z," is dependent on the input colors from the RGB color space (or in the case of a second conversion, from the converting color space). Although the tristimulus values are three by definition, as noted above, the conversion can involve more than three color channels, including color channels that define colors imperceptible to the human eye. In various embodiments, the conversion governed by Equation. 1 can form a key for a scanning device to scan an image defined by the conversion, such as a matrix, e.g., matrix barcode or fiducial marker. In various embodiments, this means that in addition to providing a vehicle for increasing the numbers of color channels and colors for an image to be scanned, which means increasing bits of information that can be encoded therein, another benefit of various embodiments is offering a manner to securely encode information, e.g., without knowing the equation or equations of what color space govern and without knowing the input values (which are based on the first color space associated with the entity, object, or environment), a successful scan cannot occur. Accordingly, in various embodiments, the logic 160 of system 100 can cause the processor 140 (and/or an application programmed to carried out the corresponding operations) to provide a scanning device 197 with a key governed by Equation 1 in order to scan and decode an image, e.g., encoded material on a tape, display, or other medium corresponding to encoded data (e.g., video data, audio data, image data, spatial data (which can create three-dimensional renderings), etc.) that is encoded pursuant to one or more color space conversions associated with Equation 1.

Although not expressly shown, if a conversion from the converted-to (e.g., derivative) XYZ color space to another color space, e.g., LAB, is required, then any suitable algebraic or other mathematical equation from the conversion to XYZ to the other color space, e.g., LAB, can be used, and the second equation can also form a part of the key for scanning the scannable image associated therewith.

In various embodiments, the logic 160 of system 100 can cause a processor 140 to provide a scheme for adding either one or both of an ultraviolet layer and/or an infrared layer to an image, such as a matrix, e.g., matrix barcode or fiducial marker, where the image contains more than one non-black or non-white colors governed by any suitable color space. In various embodiments, the scheme may include both an ultraviolet layer and an infrared layer, where the ultraviolet layer may form the first layer of an image in order to take advantage of its properties. In various embodiments, the non-black and non-white colors of the scannable image may be determined by one or more color space conversion techniques as outlined herein. In various embodiments, Non-black and non-white colors means colors that are not black or white. In various embodiments, non-black and non-white colors means colors that are not black, white or based on a greyscale distribution.

Figure 4:
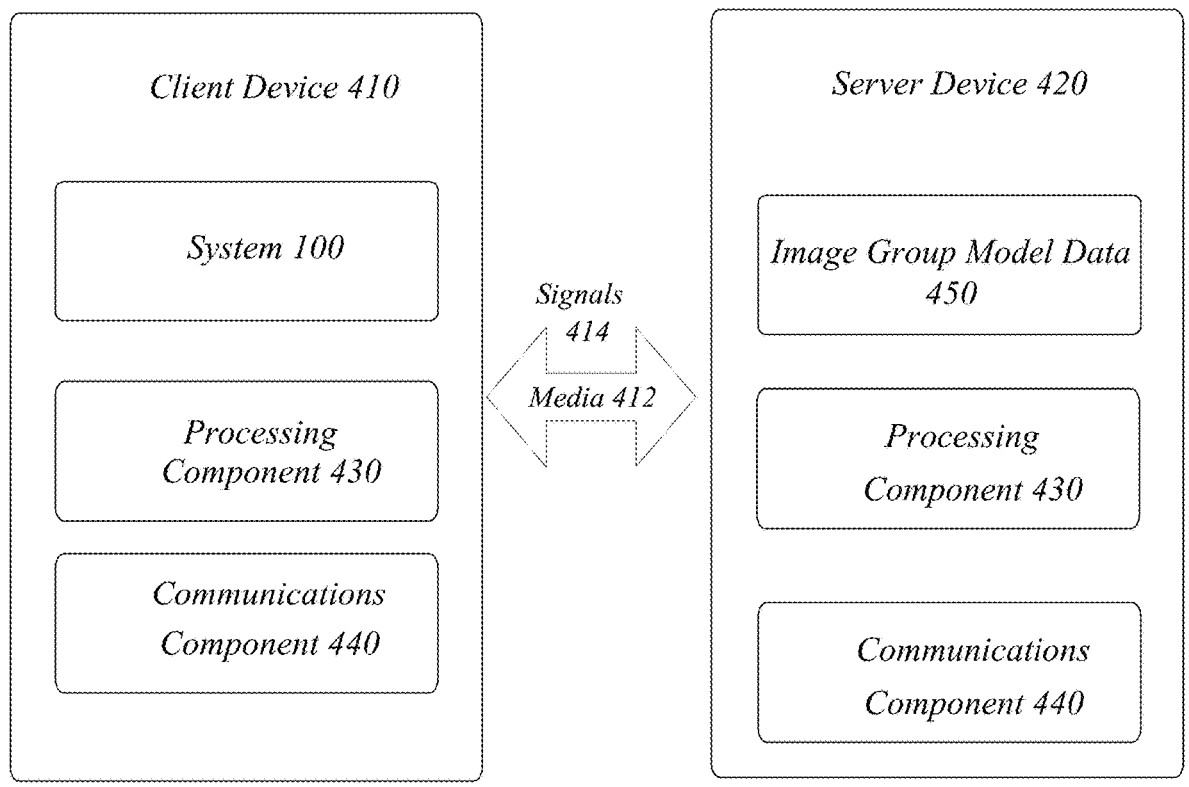
FIG. 4 illustrates an embodiment of a centralized system that provides color-based fiducial markers utilizing local adaptive technology.

FIG. 4 illustrates a block diagram of a distributed system 400. The distributed system 400 may distribute portions of the structure and/or operations for the system 100 across multiple computing entities. Examples of distributed system 400 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 400 may comprise a client device 410 and a server device 420. In general, the client device 410 and/or the server device 420 may be the same or similar to the apparatus 120 as described with reference to FIG. 1. For instance, the client device 410 and the server device 420 may each comprise a processing component 430 which is the same or similar to the processing circuit 440 as described with reference to FIG. 1. In another example, the devices 410, 420 may communicate over a communications media 412 using communications signals 414 via a communications component 440.

The server device 420 may communicate with other devices over the communications media 412, using communications signals 414, via the communications component 440. The other devices may be internal or external to the device 420 as desired for a given implementation.

The client device 410 may comprise or employ one or more client programs that operate to perform various methodologies in accordance with the described embodiments. In one embodiment, for example, the client device 410 may implement the system 100 including the logic 160 of FIG. 1, wherein various embodiments, the client device 410 can implement one or more operations to form an image based on one or more color space conversions as outlined above and herein, and where the client device 410 may print or instruct another the device to encode the color space conversion as encoded data on a physical medium.

The server device 420 may comprise or employ one or more server programs that operate to perform various methodologies in accordance with the described embodiments. In one embodiment, for example, the server device 420 may implement the clustering process 200 of FIG. 2 and generate image group model data 450 and/or generate image group model data 450 by performing one or more of the encoding and color space conversion operations of scheme 300. The image group model data 450 can include a printing scheme or color distribution for an image to be scanned in an entity, object, or environment, such as a matrix, e.g., matrix barcode or fiducial marker.

The devices 410, 420 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The devices 410, 420 may execute instructions, processing operations, or logic for the system 100 using the processing component 430. The processing component 430 may comprise various hardware elements, software elements, or a combination of both. Examples of hardware elements may include devices, logic devices, components, processors, microprocessors, circuits, processing circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

The devices 410, 420 may execute communications operations or logic for the system 100 using communications component 440. The communications component 440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 440 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 412 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

Figure 5:
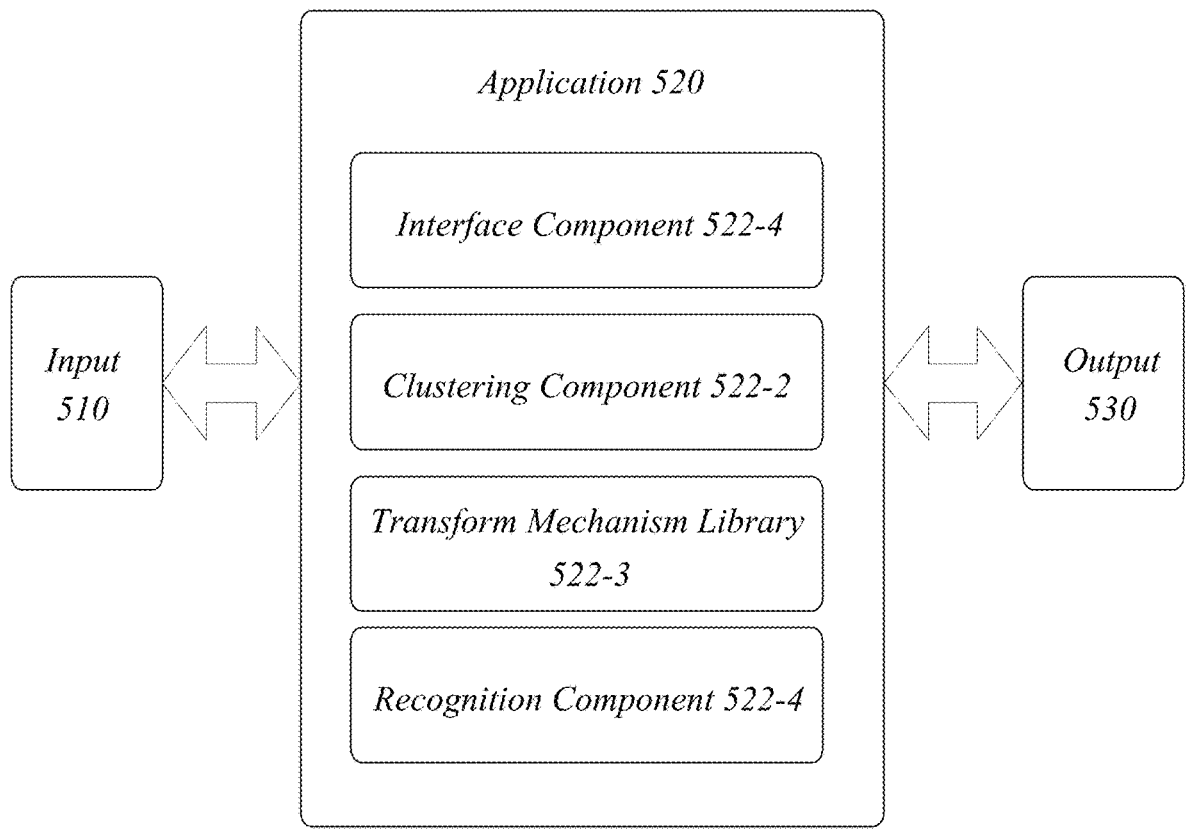
FIG. 5 illustrates an embodiment of an operating environment that provides color-based fiducial markers utilizing local adaptive technology.

FIG. 5 illustrates an embodiment of an operational environment 500 for the systems 100 and/or 400. As shown in FIG. 5, the operating environment 500 includes an application 520, such as an enterprise software application, for processing input 510 and generating output 530.

The application 520 comprises one or more components 522-*a* where *a* represents any integer number. In one embodiment, the application 520 may comprise an interface component 522-1, a clustering component 522-2, a transform mechanism library 522-3, and a recognition component 522-4. The interface component 522-1 may be generally arranged to manage a user interface for the application 520, for example, by generating graphical data for presentation as a Graphical User Interface (GUI). The interface component 522-1 may generate the GUI to depict various elements, such as dialog boxes, HTML, forms having rich text, and/or the like.

The clustering component 522-2 may be generally arranged to organize images into image groups or clusters. Some embodiments of the clustering component 522-2 execute the clustering process 200 of FIG. 2 and/or one or more of the color space conversion operations of scheme 300 of FIG. 3 and generates the image group model data 450 of FIG. 4. In various embodiments, the clustering component 522-2 identifies, for each image group, a particular color space transform having a higher likelihood than a current color space transform of success in edge detection for that group as outlined herein or otherwise suitable. The clustering component 522-2 may use that scheme to encode multimedia data on one or more physical medium, such as a tape, and using any device for doing such as discussed herein or otherwise suitable. In various embodiments, the clustering component 522-2 may perform the above-mentioned clustering process for a variety of edge detection techniques, resulting in sets of image groups where each set of image groups corresponds to a particular technique. Edge detection techniques vary in how boundaries are identified in an image; some techniques detect differences in color whereas other techniques measure another attribute. Some techniques differ with respect to how color differences are even measured. It is possible for one technique to alter certain steps and create multiple techniques.

The color space transform library 522-3 includes a plurality of color space transform mechanisms and may be generally arranged to provide a color space transform mechanism for application on an image, transforming that image into a transformed image in accordance with a different color space model than the image's original color space model. As described herein, the color space model refers to a technique for modeling an image's color data, such as in RGB or in LAB, or RGB to XYZ, or RGB to XYZ to another XYZ. In general, and as outlined in one or more embodiments herein, the color space transform mechanism performs mathematical operations to map a data point within the image's original/current color space model into a corresponding datapoint in accordance with the different color space model. The transformation may involve converting the datapoint's value(s)—which are in one domain—into corresponding value(s) for the corresponding datapoint. As an example, the color space transform may convert an RGB pixel having a tuple of RGB values into a LAB pixel having a tuple of LAB values, an RGB pixel having a tuple of RGB values into an XYZ pixel having a tuple of XYZ values, and/or an RGB pixel having a tuple of RGB values into an XYZ pixel having a tuple of XYZ values and again into another XYZ pixel having a tuple of other XYZ values. The pixels associated with the final conversion can define a color distribution for a scannable image, such as a matrix or matrix barcode that is used for a scan in association with an entity, object, or environment.

The recognition component 522-4, such as a suitable scanner, printer and/or camera or application for the same, may be generally arranged to execute an edge detection technique as part of a recognition operation on the transformed image. One example of a well-known recognition operation is Optical Character Recognition (OCR). The application 520 invokes the recognition component 522-4 to perform various tasks including scanning a matrix, e.g., matrix barcode or fiducial marker, for verifying an authenticity of an item and/or to obtain encoded information associated with the barcode. The recognition component 522-4 can be configured to contain a key, e.g., a mathematical equation or equations with specified inputs defining a color space conversion, such that it scans relevant colors reflected by the barcode, where the colors are based on one or more color space transformation techniques as outlined herein, where the key defines a final transformation that defines color channels and a color space associated with colors of the scannable image, and where color channels defined by the key each represent at least one bit of encoded data.

In various embodiments, the recognition component 522-4 can print or provide a schema for printing an image, e.g., barcode and/or fiducial marker, that contains one or more non-black and non-white colors and one or both of an ultraviolet layer and an infrared layer. The color channels associated with each non-black and non-white color each can constitute at least one bit of data, and each one of the infrared and ultraviolet layers can each constitute one bit of data. In various embodiments, each one of the non-black and non-white colors are generated by a color space transformation mechanism or technique and are scannable by a key associated with the transformation mechanism. In various embodiments, the number of color channels can be adjusted to be greater than or equal to four color channels, as the recognition component 522-4 can be adjusted to scan any number of colors, including colors not perceptible to the human eye.

In various embodiments, the non-black and non-white color channel can be used in conjunction with one or both of the infrared or ultraviolet layers on a scannable image, such as a matrix, matrix barcode and/or fiducial marker, where each of one of the color channels, ultraviolet layer(s), and/or infrared layer(s) represent a bit of data and a different manner of encoding data into the image, and as such, six or more bits of data can be encoded into the image. In various embodiments, the ultraviolet layer may be printed or displayed first in relation to the infrared layers and the various layers associated with non-black and non-white color channels to take advantage of the ultraviolet layer's properties.

In various embodiments, the image containing all or one of the layers associated with the non-black and non-white color channel layers, the ultraviolet layers, and the infrared layers can be scanned by the recognition component 522-4 for a verification component, where the recognition component 522-4 may contain or receive a key that is based on an equation related to a color space conversion, e.g., Equation 1, where the color space conversion reveals the relevant color channels with associated colors containing the information, in addition to one or more verification bits indicating whether the presence or absence of an ultraviolet and/or infrared layer is indicative of encoded information. Accordingly, the key and/or verification bit provides a manner of decoding information.

In various embodiments, application 520 is configured to contain the key and/or verification bit and provide an output 530 once the scan of the image, e.g., barcode, is verified locally. In various embodiments, the recognition component 522-4 can require an additional verification step of contacting a host system that contains one or more of the functionalities of system 100, to confirm, e.g., by one or more comparison steps, that the key and/or verification bit used by the recognition component 522-4 is accurate. If the key is accurate, and the scan is confirmed by the recognition component 522-4, then the output 530 of application 520 is one or more access, transfer, or receipt of information, including currency, personal, and/or financial information, to another entity.

In various embodiments, scanning the image, e.g., matrix, a matrix barcode, and/or fiducial marker can be done to protect a user from financial misappropriation. The recognition component 522-4 may perform the text or image recognition operation to determine whether the image, e.g., barcode, is valid, and relates the validity of the scan to a verification or access of information that includes any sensitive information, such as a password or social security number (SSN), according to some embodiments. The application 520 may invoke the recognition component 522-4 to scan an image, e.g., a barcode, prior to publishing social network content such that a potential failure to properly scan the image, e.g., the component scanning the image does not have a key that properly decodes it pursuant to the key related to the color space information and/or the bit indicating that an ultraviolet and/or infrared layer contains information, identification of sensitive information in that content prevents said publishing. In various other embodiments, the scanning of the image, e.g., barcode, can provide initiation of a financial transaction, e.g., transfer of any suitable electronic funds.

Figure 6A:
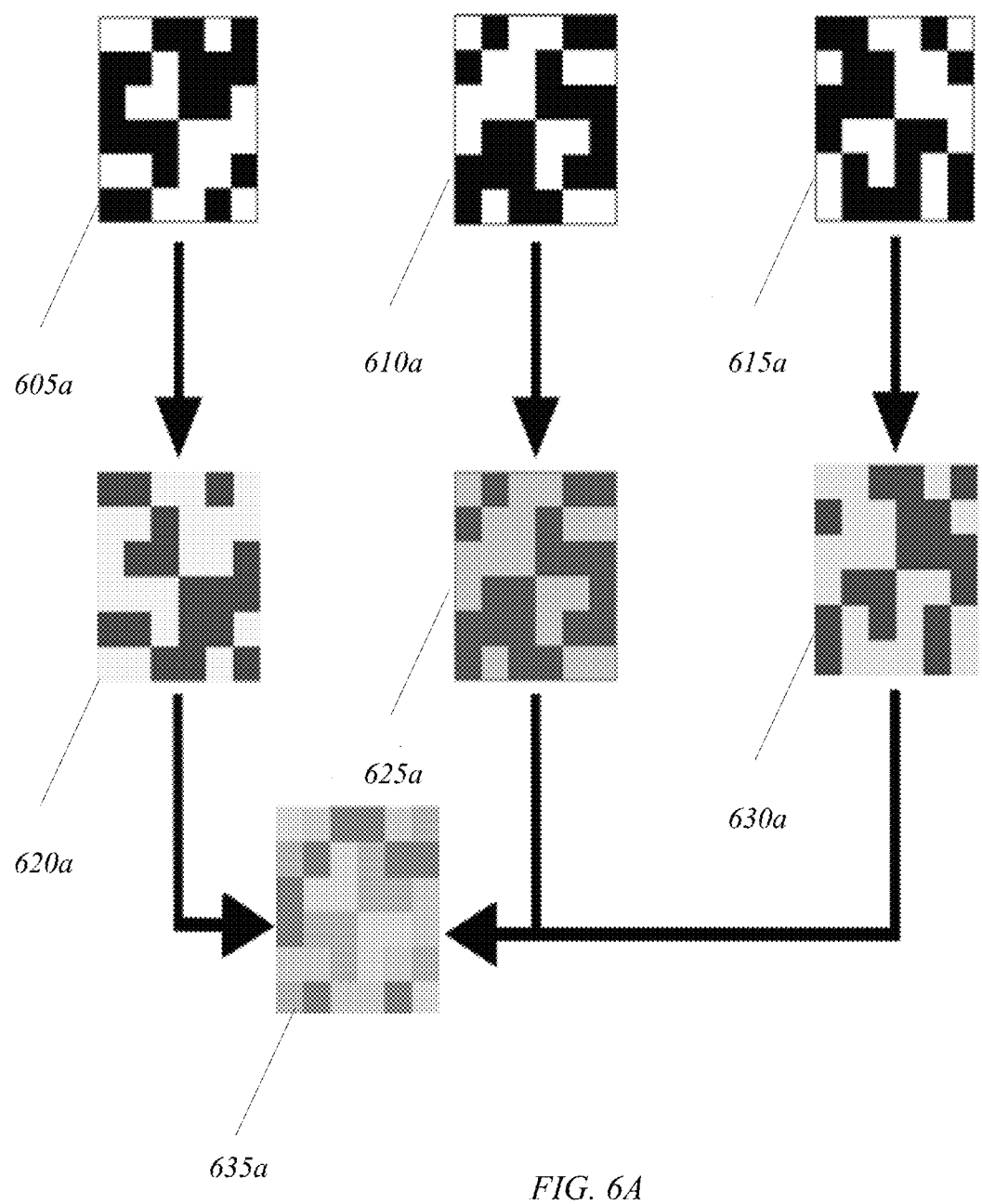
FIGS. 6A-6C illustrate formation of a scannable image in accordance various embodiment of the present disclosure.

FIG. 6A illustrates one technique 600A of forming a scannable image in accordance with at least one embodiments of the present disclosure. Scannable image layers 605a, 610a, and 615a each represent a layer of a scannable image, such as a barcode, associated with one or more colors. Any suitable component as disclosed herein may perform one or more color space transformation techniques on each scannable image layers 605a, 610a, 615a in order to produce layers 620a, 625a, and 630a, and layers 620a, 625a, and 630a may be consolidated into a single scannable image, e.g., barcode, 635a. In various embodiments, the scannable layers 620a, 625a, and 630a may each be associated with a color channel that represents one or more colors that are absent and/or not prevalent in relation to a target that may be associated with the scannable image 635a, wherein various embodiments one or more color channels associated with colors of 620a, 625a, and 630a may be orthogonal or perpendicular in relation to one another and with respect to color spaces representing those colors. The scannable image 635a can be printed on a physical surface of a target using any suitable device and/or generated by any suitable computing device for display on a computer display.

Although the embodiment of FIG. 6A illustrates performing a transformation technique with respect to color schemes that are associated with existing scannable image layers 605a, 610a, and/or 615a, scannable image 635a can be generated from scratch without converting from existing images, e.g., a target can be scanned, color spaces associated therewith determined therefrom, and a final scannable image 635a can be produced by performing one or more color space transformations on the color spaces as disclosed herein or otherwise suitable.

Figure 6B:
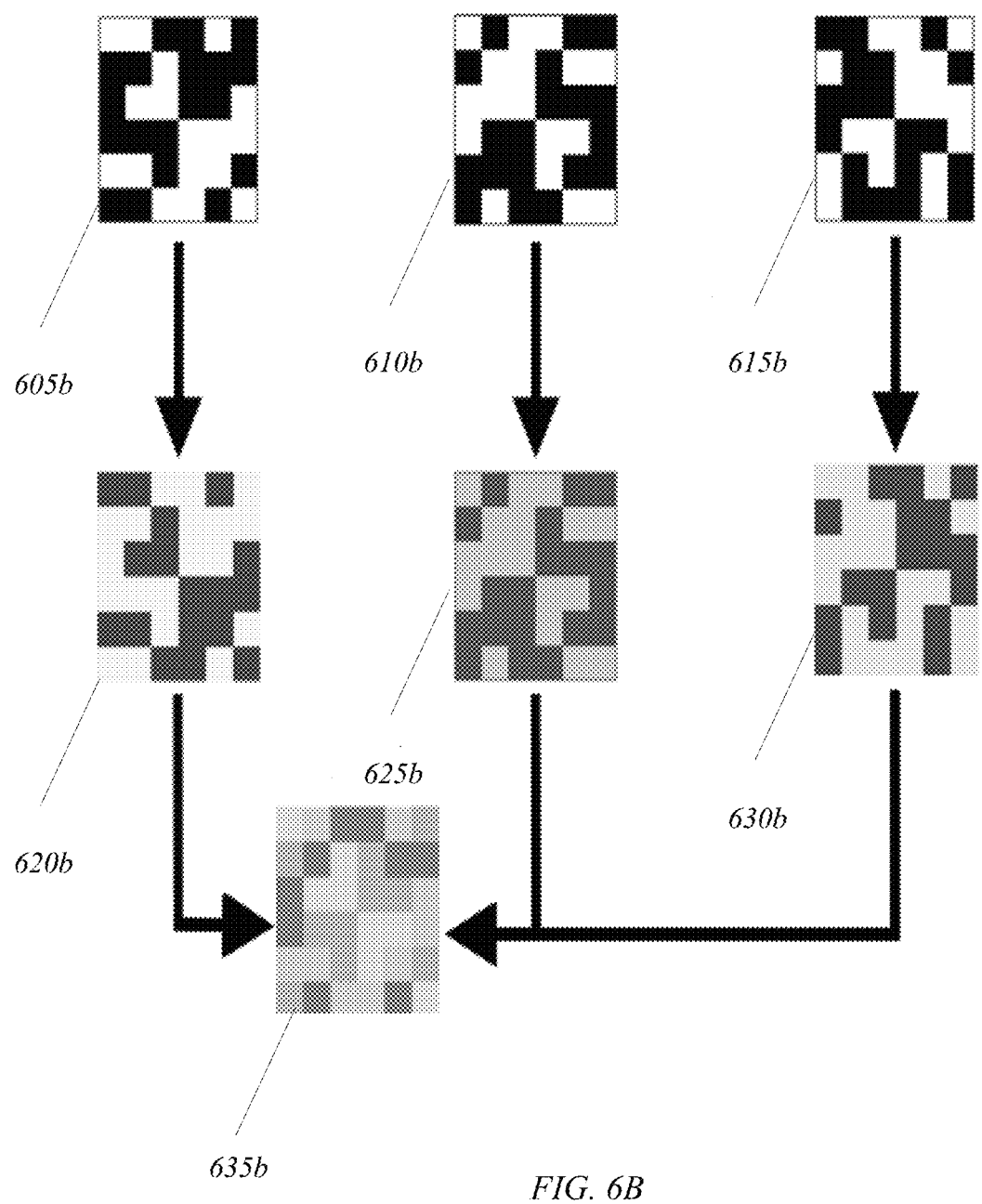

FIG. 6B illustrates one technique 600B of forming a scannable image in accordance with at least one embodiments of the present disclosure. Scannable image layers 605b, 610b, and 615b each represent a layer of a scannable image, such as a barcode, associated with one or more colors. Any suitable component as disclosed herein may perform one or more color space transformation techniques on each scannable image layers 605b, 610b, 615b in order to produce layers 620b, 625b, and 630b, and layers 620b, 625b, and 630b may be consolidated into a single scannable image 635b, e.g., barcode, 635b. In various embodiments, the scannable layers 620b, 625b, and 630b may each be associated with a color channel that represents one or more colors that are absent and/or not prevalent in relation to a target that may be associated with the scannable image 635b, wherein various embodiments one or more color channels associated with colors of 620b, 625b, and 630b may be orthogonal or perpendicular in relation to one another and with respect to color spaces representing those colors. In various embodiments, at least one layer, e.g., 630b, can be made with ultraviolet or infrared ink or generated using ultraviolet or infrared light such that it contains an additional channel of information, e.g., an ultraviolet layer or infrared layer of information, which can absorb, reflect, project, and/or illuminate ultraviolet or infrared light, wherein various embodiments the ultraviolet layer or infrared layer 630b may be the first layer of image 635b. In various embodiments, the ultraviolet or infrared layer 630b may contain a color channel layer representing various colors, including colors that are not prevalent and/or absent from a target to be associated with the scannable image 635b, and in various embodiments, only an ultraviolet channel may be associated with the ultraviolet layer 630b.

In various embodiments, the scannable image 635b can be printed on a physical surface of a target using any suitable device and/or generated by any suitable computer device for display on a computer display.

In various embodiments, the scannable image 635b is a fiducial marker that takes advantage of the inherent orienting features of ultraviolet and/or infrared light when being scanned by a suitable device that can detect either one or both of ultraviolet and/or infrared light. In various embodiments, when a suitable device, e.g., scanning device 197, scans a fiducial marker 635b that reflects ultraviolet and/or infrared light, the spatial relationship of the object associated with the fiducial maker 635b, e.g., an object with the fiducial marker labeled thereon and/or a computer display generating the fiducial marker 635b, in relation to the scanning device 197 and other objects in an environment containing the device is easier to ascertain because of the inherent properties associated with the reflection and detection of ultraviolet and/or infrared light.

Figure 6C:
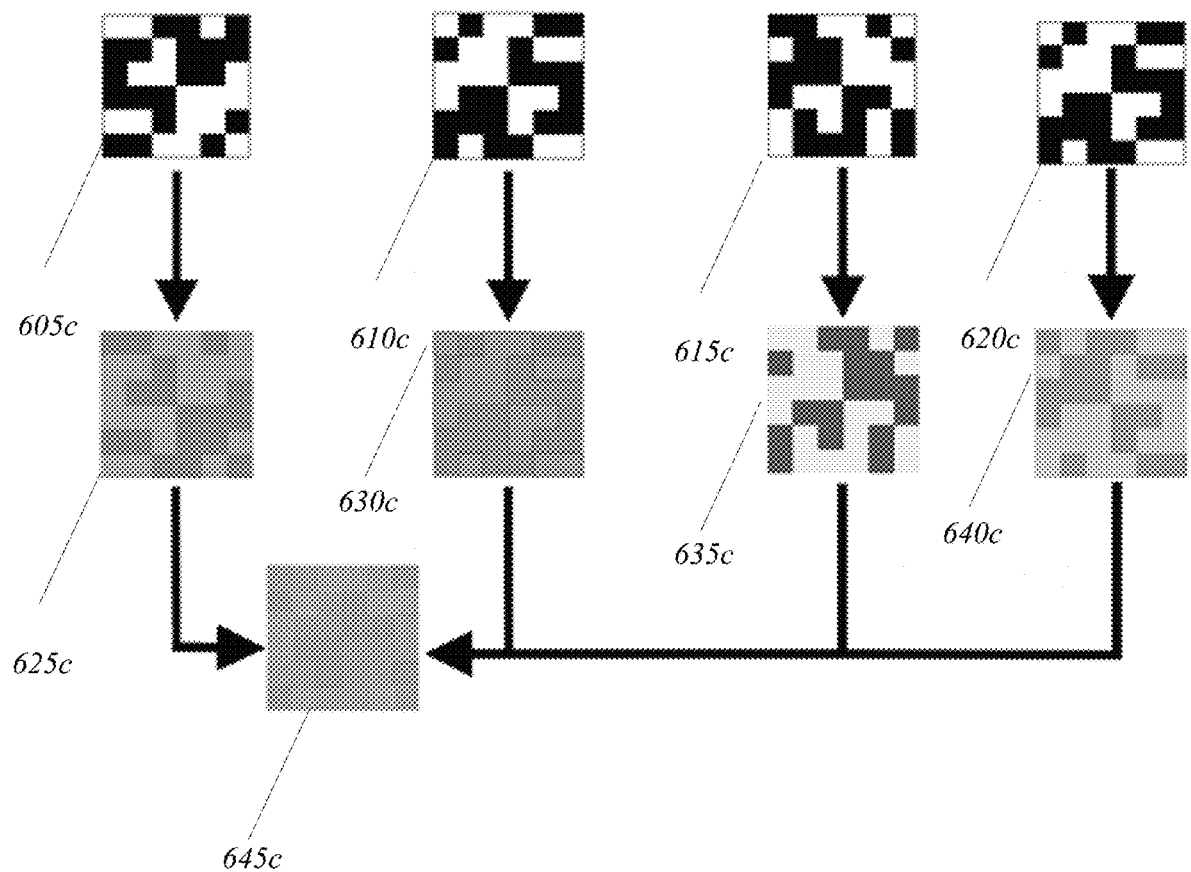

FIG. 6C illustrates one technique 600C of forming a scannable image in accordance with at least one embodiments of the present disclosure. Scannable image layers 605c, 610c, 615c, and 620c each represent a layer of a scannable image, such as a barcode, associated with one or more colors. Any suitable component as disclosed herein may perform one or more color space transformation techniques on each scannable image layers 605c, 610c, 615c, and 620c in order to produce layers 625c, 630c, 635c and 640c, and layers 625c, 630c, 635c and 640c may be consolidated into a single scannable image, e.g., barcode, 645c. In various embodiments, the scannable layers 625c, 630c, 635c and 640c may each be associated with a color channel that represents one or more colors that are absent and/or not prevalent in relation to a target that may be associated with the scannable image 645c, wherein various embodiments one or more color channels associated with colors of 625c, 630c, 635c and 640c may be orthogonal or perpendicular in relation to one another and with respect to color spaces representing those colors.

In various embodiments, at least one layer, e.g., 635c, can be made with infrared ink or generated using infrared light such that it contains an additional channel of information, e.g., an ultraviolet layer of information, which can absorb, reflect, project, and/or illuminate infrared light, wherein various embodiments the infrared layer 630c may be the first layer of image 635c. In various embodiments, the infrared layer 630c may contain a color channel layer representing various colors, including colors that are not prevalent and/or absent from a target to be associated with the scannable image 645c, and in various embodiments, only an infrared channel may be associated with the infrared layer 630c. In various embodiments, at least one layer, e.g., 640c, can be made with ultraviolet ink or generated using ultraviolet light such that it contains an additional channel of information, e.g., an ultraviolet layer of information, which can absorb, reflect, project, and/or illuminate ultraviolet light, wherein various embodiments the ultraviolet layer 640c may be the first layer of image 645c. In various embodiments, the ultraviolet layer 640c may contain a color channel layer representing various colors, including colors that are not prevalent and/or absent from a target to be associated with the scannable image 645c, and in various embodiments, only an ultraviolet channel may be associated with the ultraviolet layer 640c.

In various embodiments, the scannable image 645c is a fiducial marker that takes advantage of the inherent orienting features of ultraviolet and/or infrared light when being scanned by a suitable device that can detect either one or both of ultraviolet and/or infrared light. In various embodiments, when a suitable device, e.g., scanning device 197, scans a fiducial marker 645c that reflects both ultraviolet and infrared light, the spatial relationship of the object associated with the fiducial maker 645c, e.g., an object with the fiducial marker labeled thereon and/or a computer display generating the fiducial marker 645c, in relation to the scanning device 197 and other objects in an environment containing the device is easier to ascertain or detect because of the inherent properties associated with the reflection and detection of ultraviolet and/or infrared light. In various embodiments, where fiducial marker 645c utilizes both ultraviolet and infrared light, the presence of both operates as a fail-safe if the functionality of the scanning device 197 is compromised, and/or if an initial scan fails to detect one or the other.

In various embodiments, the scannable image 645c may include both an infrared layer 635c and an ultraviolet layer 640c, where the printing or generating of layer 645c may be such that the ultraviolet layer 640c may be the first layer in order to take advantage of the characteristics associated with ultraviolet light. Although at least one embodiment provided above indicates that either one or both of layers 635c and 640c can include color channel information, e.g., scannable colors that have a relationship with a target, in various embodiments, layers 635c and 640c can be associated strictly with infrared and/or ultraviolet information respectively. Moreover, in various embodiments, the colors of layer 620c, 625c, and 630c do not have to be layer that has a relationship with the target, and in various embodiments, said layers can be composed of black and white colors and/or other colors unrelated to the target and/or not based on color space conversion techniques.

Figure 7A:
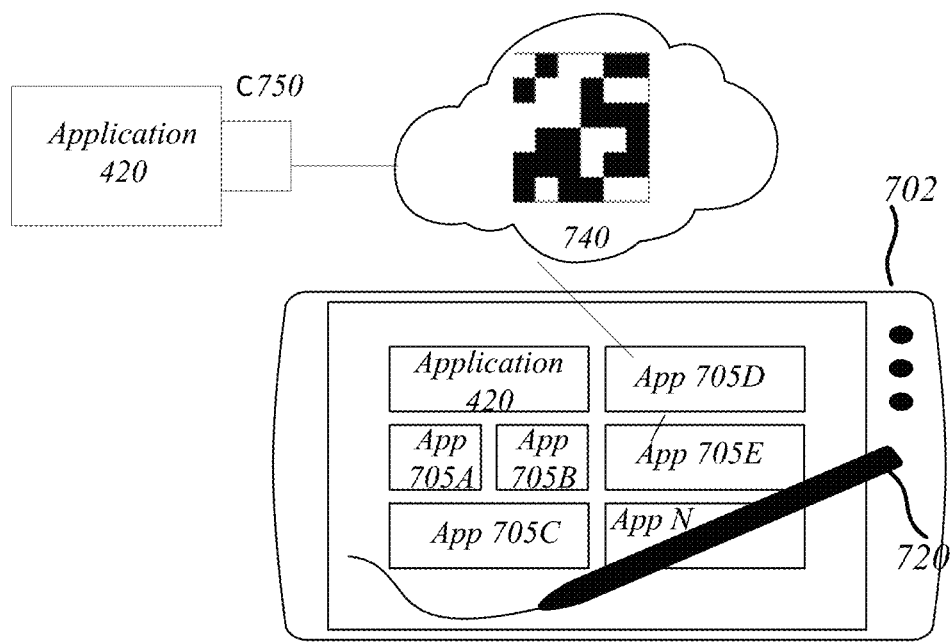
FIGS. 7A-7C illustrate embodiments of computing systems.

FIG. 7A illustrates a computer or tablet system 700A for generating and scanning a scannable image 740. In various embodiments, although system 700A is illustrated as a tablet system, it may be another computer device, such as a personal user computer, laptop, or any other suitable computer device, and the tablet system 700A may be configured to carry out one or more operations of FIG. 1. The tablet system includes a tablet 702 for generating a scannable image 740, e.g., barcode, where the tablet 702 includes applications 705A-E, application N, and application 520, where one embodiment of application 520 is described in greater detail above with respect to FIG. 5. In various embodiments one or more of the applications 705A-E may carry out one or more operations associated with FIG. 1. The tablet 702 may include one or more user interface devices 720 which a user can use to interface with the tablet 702. The tablet 702 can generate a scannable image 740 that includes one or both of an ultraviolet and infrared layer. The tablet 702 can be configured to ensure that the top layer is an ultraviolet layer to take advantage of the properties inherent with ultraviolet light. The scannable image 740 can further include one or more colors layer, including white and black layers. The scannable image 740 can further include one or more non-black and non-white colors layers that are related to colors associated with the environment where the tablet is located, e.g., the tablet can be configured to have a camera with an application, e.g., 420, that can scan an environment and produce a scannable image 740 with colors related to that environment and/or segment 193 of the environment. In various embodiments, the colors related to the environment can be colors based on one or more color space transformation techniques as discussed herein, including colors that are least prevalent and/or absent from the environment containing the tablet 702 and determined by one or more color space conversions. Similarly, the color space transformation techniques may modify the color spaces of the scannable image 740 as the scannable image 740 moves from one segment 193 to another segment 193 of an environment.

The system 700A can further include a camera or scanning device c750 that can scan the scannable image 740, wherein various embodiments the camera or scanning device c750 may include application 520 (as discussed above), and/or a color space key and/or infrared verification bit and/or ultraviolet verification bit as disclosed herein, and in order to perform a valid scan of scannable image 740 and/or obtain any encoded information associated therewith.

Figure 7B:
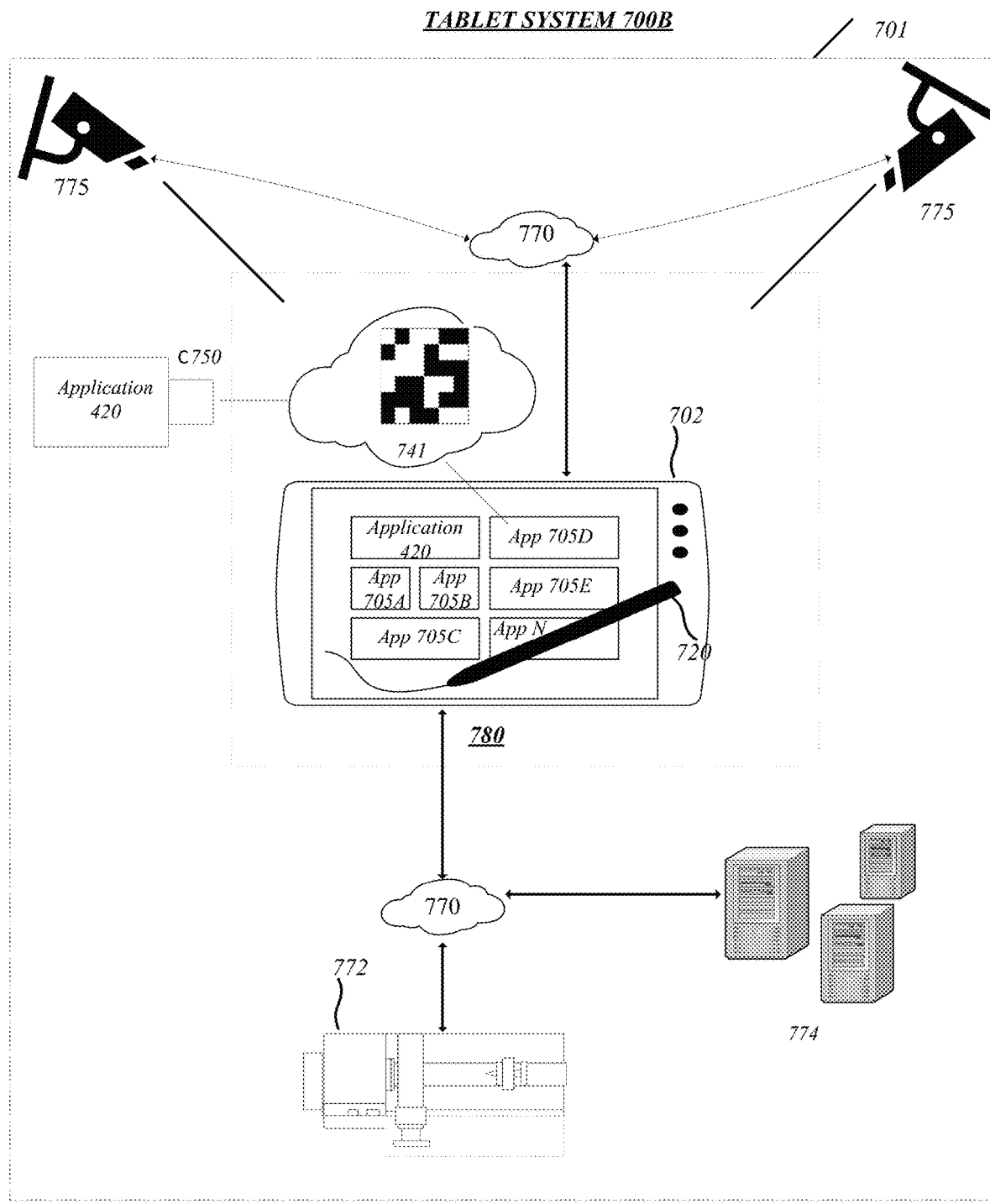

FIG. 7B illustrates a computer or tablet system 700B for generating and/or scanning a scannable image 741 and using the scannable image for providing orientation for industrial, robotic, or computer equipment (e.g., a virtual-reality system). In various embodiments, although system 700B is illustrated as a tablet system, it may be another computer device, such as a personal user computer, laptop, or any other suitable computer device, and the tablet system 700B may be configured to carry out one or more operations of FIG. 1. The tablet system includes a tablet 702 for generating a scannable image 740, e.g., barcode, where the tablet 702 includes applications 705A-E, application N, and application 520, where one embodiment of application 520 is described in greater detail above with respect to FIG. 5. In various embodiments, one or more of the applications 705A-E may carry out one or more operations associated with FIG. 1. The tablet 702 may include one or more user interface devices 720 which a user can use to interface with the tablet 702. The tablet 702 can generate a scannable image 740 that includes one or both of an ultraviolet and infrared layer. The tablet 702 can be configured to ensure that the top layer is an ultraviolet layer to take advantage of the properties inherent with ultraviolet light. The scannable image 741, e.g., fiducial marker, can further include one or more colors layer, including white and black layers. The scannable image 741 can further include one or more non-black and non-white colors layers that are related to colors associated with the environment where the tablet is located, e.g., the tablet can be configured to have a camera with an application, e.g., 420, that can scan an environment and produce a scannable image 741 with colors related to that environment and/or colors related to each segment 193 of the environment. In various embodiments, the colors related to the environment and/or segment 193 of the environment can be colors based on one or more color space transformation techniques as discussed herein, including colors that are least prevalent and/or absent from the environment containing the tablet 702 and determined by one or more color space conversions.

The system 700B can further include a camera or scanning device c750 that can scan the scannable image 741, wherein various embodiments the camera or scanning device c750 may include application 520 (as discussed above), and/or a color space key and/or infrared verification bit and/or ultraviolet verification bit as disclosed herein, and in order to perform a valid scan of scannable image 740 and/or obtain any encoded information associated therewith.

The system 700B can further include one or more scanning or camera devices 775, one or more servers 774, a network 770 for facilitating communication between and amongst the various components of system 700B, and a device configurable with a fiducial marker 774 (hereinafter referred to as "fiducial device 772"). In various embodiments, an environment 701 containing the tablet 702 and associated with tablet system 700B is shown. In various embodiments, displayed image 741 is a fiducial marker. In various embodiments, the functions of one or more scanning or camera devices 775 and/or camera and/or scanning device c750 may be carried out by a camera, scanning, or other suitable device (not shown) that is part of tablet 702. In various embodiments, the functions of one or more scanning or camera devices 775 may be carried out by a camera device or scanning device c750. In various, the environment for purposes of scanning and optimization in terms of altering the fiducial marker (as discussed herein) can be a proximate portion 780 of the overall environment 701 in relation to the tablet 702. Although shown as a tablet 702, the tablet 702 can be a computer, a camera that can be programmed with one or more computer operations, a laptop, or any other suitable computing device.

In various embodiments, the tablet 702 displays a marker useful for a device to use the marker as a point of spatial reference, e.g., a fiducial marker 741. The tablet 702 may directly transmit the fiducial marker 741 to a device 774 that can detect the marker or utilize it in relation to another object, such as one or more scanning or camera devices 775 to orient itself and take an action with respect to the another object. The device may be a fiducial device 772, such as an augmented reality device, a virtual reality device, and/or a robot configured to take a physical action with respect to other objects associated with the environment 701. Whatever type of fiducial device 772 is utilized, in various embodiments, detection of the fiducial device 772 by another device communicating with the fiducial device 772, e.g., one or more camera devices 775 or any other suitable device associated with the environment 701 may be important, as receipt of data by the fiducial device 772 and orientation of the fiducial device 772 in relation to the data providing device may be important for the fiducial device 772 to carry out its functions. For example, if the fiducial device 772 is a robot for taking an action in the environment 701, the one or more camera devices 775 may feed the fiducial device 772 with image data acquired by scanning the environment (directly or indirectly by the tablet 702 receiving the data and tram sitting it to the fiducial device 772), where the image data may provide the robot 772 with the information it requires to move in the environment 701 and take an appropriate action in the environment 701, e.g., contact or move an object in associated therewith. Proper detection of the fiducial marker 741 which is transmitted to fiducial device 772 by a data providing device, such as the tablet 702, the one or more cameras 775, and/or any other component of system 700B and/or any other component that may be in environment 701 can allow the fiducial device to orient itself with respect to that device or otherwise better perform a spatial action. By way of another example, if the fiducial device 772 is an augmented reality system associated with a user the one or more camera device 775 may provide the augmented reality device with information that is relevant to coordinating user movement in the real environment 701 in relation to a virtual environment associated with the augmented reality system 772 (e.g., this may prevent the user from feeling a physical discomfort, such as dizziness). Accordingly, proper detection of the fiducial device 772 by the relevant component associated with the environment 701 may be important in various contexts at least because the fiducial device may perform a spatial orientation action that enhances its performance and functionality.

In various embodiments, the tablet 702 may transmit the color space and color distribution associated with the displayed fiducial marker 741 to one or more servers 774, where the one or more servers 774 may transmit the data associated with the fiducial marker 741 to the fiducial device 772, which may have a display of its own that can display and reproduce the fiducial marker 741 and/or otherwise utilize the data for proper detection.

In various embodiments, the one or more scanning or camera devices 775 continuously scan the environment 701 to determine if the colors and associated color space of the environment changes, e.g., new colors are introduced, colors are altered, and/or any other change occurs which results in the color profile of the environment 701 changing. In response to detecting a change in the environment 701, the one or more scanning or camera devices 775 may transmit the image data associated with changed environment 701 to the tablet 702.

In various embodiments, the one or more scanning or camera devices 775 continuously scan the environment 701 to segment the environment 701 into a plurality of segments 193. An optimal color space may be determined for each segment 193 of the environment according to the techniques described herein. The one or more scanning or camera devices 775 continuously scan the environment 701 to detect the movement of an object, e.g., the fiducial marker 741 and/or a device or other medium displaying the fiducial marker 741. As the position of the fiducial marker 741 moves in the environment, the fiducial marker 741 may be modified to have the color space of the segment 193 in which the fiducial marker 741 is located. In some embodiments, the future location of the marker 741 may be predicted (e.g., a different segment 193 than the current segment 193), and the fiducial marker 741 may be modified to have the color space of the predicted segment 193.

In some embodiments, the scanning or camera devices 775 may use localization techniques to determine which color space should be used when attempting to detect a fiducial marker 741. For example, the scanning or camera devices 775 may leverage the techniques used to determine optimal color spaces for a given segment 193 of the environment. One such example includes using the best color space (e.g., determined according to FIGS. 2-3) for optimal detection in a given segment 193. In another example, such color spaces may be defined in an application (e.g., one of the applications of the apparatus 120, the applications 705A-E, application 520, etc.). The color spaces may be defined according to one or more markers. For example, for a first segment 193 of the environment, the applications may store a definition indicating an example colorspace of "X" is used. Similarly, the applications may store a definition indicating an example colorspace of "Y" should be the next attempted colorspace (e.g., if using colorspace X does not result in detection of a fiducial marker, attempt to use colorspace Y).

In various embodiments, whether the initial fiducial marker 741 was displayed as a colored fiducial marker that had colors that were not black, white, or based on a greyscale and/or subject to a color space optimization technique as discussed herein or whether the initial fiducial marker 741 was any kind of fiducial marker 741, once the environment 701 changes, the tablet 702 (e.g., by any of applications 705A-705E) may receive image data associated with the change from the one or more camera devices 775, and perform any of the operations associated with color space transformations, color space conversions, and image processing as discussed herein, or any other color space optimization techniques, including but not limited to techniques directed to generating color spaces that do not contain black, white, or greyscale colors after all conversions associated with the technique have taken place. In various embodiments, the one or more color space optimization techniques employed by the tablet 702 produce a color space for an altered displayed fiducial marker 741 that is optimized for detection in the altered environment 701, e.g., a detection enhancement occurs with respect to scanning or camera device c750, one or more or scanning devices or cameras 775, or any other suitable detection device associated with environment 750. The altered fiducial marker 741 may be used by the tablet 702 to enhance a spatial orientation operation associated therewith and/or it may be transmitted to a fiducial device 772, which may display it (e.g., regenerate it on a display associated with fiducial device 772 after receiving the data associated with the optimized color space form the tablet 702) or otherwise utilize it to enhance a spatial orientation and/or physical movement operation. In various embodiments, the operations of the tablet 702 may be carried out directly by the fiducial device 772 as outlined herein, including accepting and receiving image data from the one or more camera and scanning devices 775, performing color space optimization techniques, and displaying the fiducial (and altered fiducial) marker 741.

In various embodiments, the environment 701 and/or the location of the fiducial maker 741 may continually change according to a time interval or other schedule (or the environment can change based on random events) and the displayed fiducial marker 741 can continually be altered based on the techniques discussed herein, such that each iteration of the fiducial marker 741 is optimized in relation to the environment (or segment 193 thereof) according to any one of the optimization techniques discussed herein. For example, each displayable iteration of the altered (and alterable fiducial marker 741, e.g., it can be changed continuously in response to environmental changes), where every displayable iteration of the alterable fiducial marker includes at least four colors, each of the four colors being different with respect to one another and to at least one prevalent color in a most recent change in the environment, where each of the four colors being different with respect to one another and at least one of the four colors being a color absent from a most recent change environment 701, and where each of the four colors being derived from a color space associated with a filtered luminance channel. The fiducial marker 741 (altered or otherwise) can also have one or more infrared or ultraviolet layers, wherein various embodiments the ultraviolet layer can be as a top layer to optimize detection. In various embodiments, the fiducial marker 741 (altered or otherwise) can be as described or can be derived as described with respect to any matrix-code or barcode as described herein and may have a color space derived utilizing any of the color space or image processing techniques as discussed herein.

In various embodiments, one or more devices or components of FIG. 7B, including the tablet 702, the fiducial device 772, the camera and/or scanning devices 775, and/or any other suitable devices associated with FIG. 7B can be configured to transmit, ingest, or process environmental color changes and transmit them to one another as necessary to ensure proper detection of environmental changes, e.g., they can be configured to scan the environment and transmit an associated histogram of the environment based on a pre-defined timing interval and/or based on detecting a spectral change of a certain magnitude. In various embodiments, appropriate mathematical operations are performed at the relevant processing device, e.g., the tablet 702 displaying a fiducial marker, to process the various histograms (e.g., an appropriate mathematical averaging technique) to determine an accurate representation of the environment, e.g., environment 701 or part of an environment 780, and in responses thereto, perform the color space optimization techniques (as discussed herein) to alter the displayed fiducial marker, e.g., 741, to be optimized in relation to the environmental changes.

In various embodiments, the environmental change or change constituting the change in which the one or more fiducial markers, e.g., 741, can be processed (e.g., pursuant to a color space conversion technique as described herein) for alteration and optimization in relation to the change or changes can be based on a suitable histogram averaging technique processed into a single histogram representing the environmental changes as a whole, e.g., a single histogram developed therefrom. In various embodiments, based on that consolidated-averaged histogram and color space representation associated therewith, one or more color space conversion (e.g., as discussed herein) can be performed with respect to the color space (and color space distribution) of the one or more fiducial markers 741, and can be performed to optimize detection of the one or more markers in relation to the environmental changes.

Figure 7C:
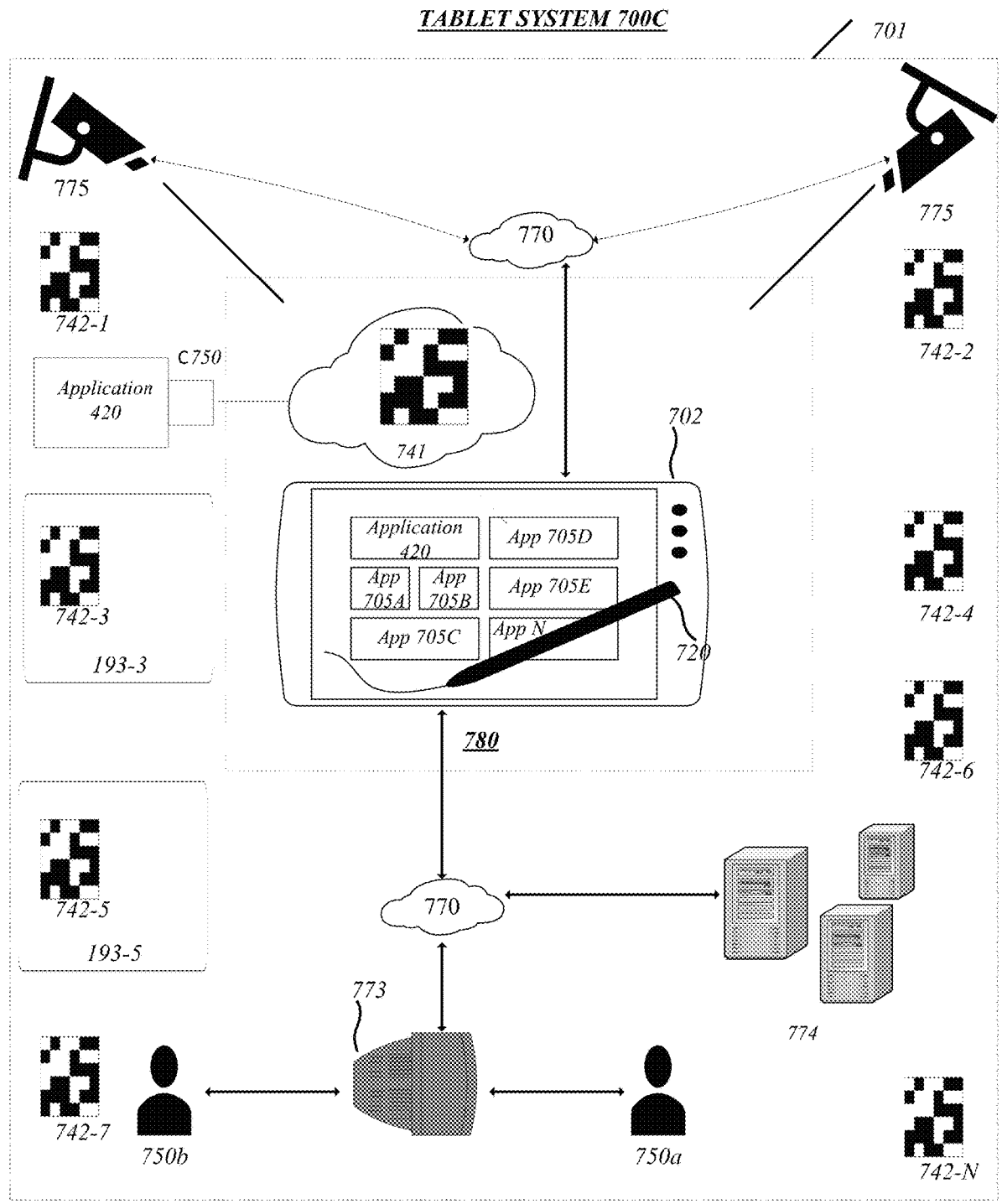

FIG. 7C illustrates an augmented reality system 700C using one or more scannable images and color space conversion techniques as illustrated herein. The system 700C may include one or more devices, including a tablet 702, camera or scanning devices 775, and other suitable devices for generating and/or scanning one or more scannable images 741, 742-1 through 742-N (which may be collectively referenced to using numeral 742) and using the scannable images for providing orientation for an augmented reality device 773 and/or updating a mesh associated therewith. Any one of the suitable devices of 700C, including the tablet 702 and/or augmented reality device 773, can carry out any operations of FIGS. 1-6C. The tablet 702 can include applications 705A-E, application N, and application 520, where one embodiment of application 520 is described in greater detail above with respect to FIG. 5. Although shown as a tablet 702, the tablet 702 can be a computer, a camera that can be programmed with one or more computer operations, a laptop, or any other suitable computing device.

In various embodiments, one or more of the applications 705A-E may carry out one or more operations associated with FIG. 1. The tablet 702 may include one or more user interface devices 720 which a user can use to interface with the tablet 702. The tablet 702 can generate a scannable image 741 that includes one or both of an ultraviolet and infrared layer. The tablet 702 can be configured to ensure that the top layer is an ultraviolet layer to take advantage of the properties inherent with ultraviolet light. The scannable image 741, e.g., fiducial marker, can further include one or more colors layer, including white and black layers. The scannable image 741 can further include one or more non-black and non-white colors layers that are related to colors associated with the environment (and/or segment 193 thereof) where the tablet is located, e.g., the tablet can be configured to have a camera with an application, e.g., 420, that can scan an environment and produce a scannable image 741 with colors related to that environment. In various embodiments, the colors related to the environment can be colors based on one or more color space transformation techniques as discussed herein, including colors that are least prevalent and/or absent from the environment containing the tablet 702 and determined by one or more color space conversions.

In various embodiments, the tablet 702 and/or any other component of system 700C, such as cameras 775, can generate multiple other scannable images 742. The scannable images 742 can be of the same or different type as described with respect to scannable image 741. Although not expressly shown, the fiducial markers can be located on or otherwise associated with various entities in the environment 701, e.g., camera 775, camera or scanning device c750, users 750a, 750b (e.g., wearing articles of clothing with one or more fiducial markers thereon for the purpose of enhancing the augmented reality experience), etc.

The system 700C can further include a camera or scanning device c750 that can scan the scannable image 741, wherein various embodiments the camera or scanning device c750 may include application 520 (as discussed above), and/or a color space key and/or infrared verification bit and/or ultraviolet verification bit as disclosed herein, and in order to perform a valid scan of scannable image 740 and/or obtain any encoded information associated therewith.

The system 700C can further include one or more scanning or camera devices 775, one or more servers 774, a network 770 for facilitating communication between and amongst the various components of system 700C, and an augmented reality device 773. In various embodiments, an environment 701 containing the associated components of system 700C. In various embodiments, displayed image 741 is a fiducial marker. In various embodiments, displayed images 742 are also fiducial markers that can be the same type (e.g., same color space distribution) or different type (e.g., same color space distribution) from the fiducial marker 741. However, each different fiducial marker 741, 742 may be colored according to the color space of the segment 193 of the environment 701 the marker is positioned in. In various embodiments, the functions of one or more scanning or camera devices 775 and/or camera and/or scanning device c750 may be carried out by a camera, scanning, or other suitable device (not shown) that is part of tablet 702, and can include projecting one or more fiducial markers 742 that can be used to orient the augmented device 773 and/or permitting the augmented reality device 773 to update an associated augmented reality mesh produced by augmented reality device 773. In various embodiments, the functions of one or more scanning or camera devices 775 may be carried out by camera device or scanning device c750. In various embodiments, the environment for purposes of scanning and optimization in terms of altering the fiducial marker (as discussed herein) can be a proximate portion 780 of the overall environment 701 in relation to the tablet 702.

As stated, in various embodiments, the one or more scanning or camera devices 775 continuously scan the environment 701 to segment the environment 701 into a plurality of segments 193. An optimal color space may be determined for each segment 193 of the environment according to the techniques described herein. The one or more scanning or camera devices 775 continuously scan the environment 701 to detect the movement of an object, e.g., the fiducial markers 741, 742 and/or a device or other medium displaying the fiducial markers 741, 742. As the position of the fiducial markers 741, 742 moves in the environment, the fiducial markers 741, 742 may be modified to have the color space of the segment 193 in which the fiducial markers 741, 742 are located (not all segments depicted for the sake of clarity). In some embodiments, the future location of a given marker 741, 742 may be predicted (e.g., a different segment 193 than the current segment 193), and the fiducial markers 741, 742 may be modified to have the color space of the predicted segment 193. For example, as shown, the fiducial markers 742-1 through 742-N may be displayed in the environment 701. However, each marker 742-1 through 742-N may be in a different segment 193 of the environment 701. Therefore, each marker 742-1 through 742-N may be colored according to the optimal color space for each segment 193 in which the corresponding marker 742-1 through 742-N is positioned. Furthermore, if the location of a given fiducial marker 742-1 through 742-N changes in real-time, the color space of the fiducial marker 742-1 through 742-N may be changed accordingly. For example, if the fiducial marker 742-1 moves to the segment 193-3 where marker 742-3 is located, the color space of the fiducial marker 742-1 may be changed to have the color space associated with the segment 193-3 where fiducial marker 742-3 is located. In such embodiments, the color space of the fiducial marker 742-1 may be changed to have the color space associated with segment 193-3 and/or the fiducial marker 742-3. Similarly, if fiducial marker 742-4 moves to segment 193-5, the fiducial marker 742-4 may be changed to have the color space associated with segment 193-5 and/or the fiducial marker 742-5.

In various embodiments, the tablet 702 displays or projects one or more markers useful for a device, e.g., augmented reality device 743, to use the one or more markers as a point of spatial reference, e.g., a fiducial marker 741 and/or at least one of the fiducial markers 742-1 through 742-N, for performing an orientation operation, and with respect to augmented reality device 743, updating a mesh in relation to devices, objects, and/or users 750a,750b in the environment 701. In various embodiments the or more scanning or camera devices 775 and/or camera and/or scanning device c750 can also display or project at least one of the one or more markers 743 useful for a device, e.g., augmented reality device 743, to use the one or more markers 743 as a point of spatial reference, e.g., a fiducial marker 741, for performing an orientation operation, and with respect to augmented reality device 743, updating a mesh in relation to devices, objects, and/or users in the environment 701.

The tablet 702, one or more scanning or camera devices 775 and/or camera and/or scanning device c750 may directly transmit the fiducial markers 741, 742 to a device 773 that can detect the marker or utilize it in order to update an augmented reality mesh that is useful for a user or users 750a, 750b enjoying the services. In various embodiments, the augmented reality device 772 is an augmented reality system associated with a user the one or more camera device 775 may provide the augmented reality device with information that is relevant to coordinating user movement in the real environment 701 in relation to a virtual environment associated with the augmented reality system 772 (e.g., this may prevent the user from feeling a physical discomfort, such as dizziness). Accordingly, proper detection of the fiducial device 772 by the relevant component associated with the environment 701 may be important in various contexts at least because the fiducial device may perform a spatial orientation action that enhances its performance and functionality.

In various embodiments, the tablet 702 or any of the other suitable devices may transmit the color space and color distribution associated with the displayed fiducial marker 741 or other fiducial markers 742 to one or more servers 774, where the one or more servers 774 may transmit the data associated with the fiducial marker 741 to the augmented reality system 743, which may have a display of its own that can display and reproduce the fiducial marker 741 and/or otherwise utilize the data for proper detection.

In various embodiments, the one or more scanning or camera devices 775 continuously scan the environment 701 to determine if the colors and associated color space of the environment changes, e.g., new colors are introduced, colors are altered, and/or any other change occurs which results in the color profile of the environment 701 changing. In response to detecting a change in the environment 701, the one or more scanning or camera devices 775 may transmit the image data associated with changed environment 701 (or a part of the environment, e.g., 780) to the tablet 702. In various embodiments, the camera devices 775 can contain suitable functionality, e.g., as provided for in FIG. 1, to perform color space conversion and image processing techniques, to project or display the one or more fiducial markers 742 and perform color space conversion in response to the scanned and/or detected changes in the environment, which can then result in changing the color space associated with at least one of the additional fiducial markers 742.

In various embodiments, whether the initial fiducial marker 741 or other initial fiducial markers 742 (prior to converting the color spaces) were displayed and projected (as suitable by the one or more devices of FIG. 7C) as a colored fiducial marker or markers that had colors that were not black, white, or based on a greyscale and/or subject to a color space optimization technique as discussed herein or whether the initial fiducial marker 741 was any kind of fiducial marker 741, once the environment 701 changes, the tablet 702 or other suitable device (e.g., by any of applications 705A-705E or as otherwise suitable) may receive image data associated with the change from the one or more camera devices 775, and perform any of the operations associated with color space transformations, color space conversions, and image processing as discussed herein, or any other color space optimization techniques, including but not limited to techniques directed to generating color spaces that do not contain black, white, or greyscale colors after all conversions associated with the technique have taken place.

In various embodiments, with respect to at least one of the one or more fiducial markers 742, the camera devices 775

(or any other device of system 700C) can be configured to have the necessary functionality, as described herein, to update the markers 742, e.g., whether the other initial fiducial markers 742 (prior to converting the color spaces) were displayed and projected (as suitable by the one or more devices of FIG. 7C) as a colored fiducial marker or markers 742 that had colors that were not black, white, or based on a greyscale and/or subject to a color space optimization technique as discussed herein or whether the initial fiducial markers 742 were any kind of fiducial marker 742, once the environment 701 changes, the cameras 775 or other suitable device may receive image data (or obtain the data directly by scanning the environment 701) associated with the change from the any suitable device of 700c (including from one camera 775 to another camera 775), and perform any of the operations associated with color space transformations, color space conversions, and image processing as discussed herein, or any other color space optimization techniques, including but not limited to techniques directed to generating color spaces that do not contain black, white, or greyscale colors after all conversions associated with the technique have taken place.

In various embodiments, the one or more color space optimization techniques employed by the tablet 702, cameras 775, or other suitable device produce a color space for an altered displayed fiducial marker 741, 742 that is optimized for detection in the altered environment 701, e.g., a detection enhancement occurs with respect to scanning or camera device c750, one or more or scanning devices or cameras 775, or any other suitable detection device associated with environment 701. In various embodiments, the augmented device 773 can use the fiducial markers 741, 742 to perform an orientation operation and/or otherwise update the mesh associated with the virtual reality experience. For example, movement in the environment 701 and/or movement of objects or entities in the environment, e.g., when the fiducial markers are on the objects or entities and the objects or entities move and/or when light is interrupted in relation to the fiducial markers 741, 742 as a result of a blocking or revealing of a line of sight (e.g., of the augmented reality device 773) based on movement in the environment 701, are more easily detectable because the fiducial markers 741,742 are more easily detectable in relation to the environmental changes, e.g., at least as a result of the color space conversions optimized in relation to the environmental changes.

In various embodiments, the environment 701 may continually change according to a time interval or other schedule (or the environment can change based on random events) and the displayed fiducial markers 741, 742 can continually be altered based on the techniques discussed herein, such that each iteration of the fiducial markers 741, 742 are optimized in relation to the environment according to any one of the optimization techniques discussed herein. For example, each displayable iteration of the altered (and alterable fiducial marker 742, e.g., it can be changed continuously in response to environmental changes), where every displayable iteration of the alterable fiducial markers can include at least four colors, each of the four colors being different with respect to one another and to at least one prevalent color in a most recent change in the environment, where each of the four colors being different with respect to one another and at least one of the four colors being a color absent from a most recent change environment 701, and where each of the four colors being derived from a color space associated with a filtered luminance channel. The fiducial markers 741, 742 (altered or otherwise) can also have one or more infrared or ultraviolet layers, wherein various embodiments the ultraviolet layer can be as top layer to optimize detection. The fiducial markers 741, 742 (altered or otherwise) can also have one or more infrared or ultraviolet layers, wherein various embodiments the ultraviolet layer can be as top layer to optimize detection. In various embodiments, the fiducial marker 741 (altered or otherwise) can be as described or can be derived as described with respect to any matrix-code or barcode as described herein and may have a color space derived utilizing any of the color space or image processing techniques as discussed herein.

In various embodiments, the color space conversion techniques can employ additional color space conversion, distinct from the optimization techniques related to optimization changes, to take advantage of a color space that may have an advantages in relation to augmented reality devices, e.g., converting from an XYZ color space associated with the optimization to environmental changes to a corresponding LAB color space, such that the final iteration of the altered fiducial markers 741, 742, and where the color space conversions can be pursuant to any suitable technique, including but not limited to as described with respect to FIG. 2.

In various embodiments, one or more devices or components of FIG. 7C, including the tablet 702, the augmented reality device 773, the camera and/or scanning devices 775, and/or any other suitable devices associated with FIG. 7C can be configured to transmit, ingest, or process environmental color changes and transmit them to one another as necessary to ensure proper detection of environmental changes, e.g., they can be configured to scan the environment and transmit an associated histogram of the environmental based on a pre-defined timing interval and/or based on detecting a spectral change of a certain magnitude. In various embodiments, appropriate mathematical operations are performed at the relevant processing device, e.g., the tablet 702 displaying or projecting a fiducial marker or fiducial markers and/or the camera devices 775 displaying or projecting a fiducial marker or fiducial markers, to process the various histograms (e.g., an appropriate mathematical averaging technique) to determine an accurate representation of the environment, e.g., environment 701 or part of an environment 780, and in responses thereto, perform the color space optimization techniques (as discussed herein) to alter the displayed fiducial marker or markers, e.g., 741 and/or 742, to be optimized in relation to the environmental changes.

In various embodiments, the environmental change or change constituting the change in which the one or more fiducial markers, e.g., 741 or 742, can be processed (e.g., pursuant to a color space conversion technique as described herein) for alteration and optimization in relation to the change or changes can be based on a suitable histogram averaging technique processed into a single histogram representing the environmental changes as a whole, e.g., a single histogram developed therefrom. In various embodiments, based on that consolidated-averaged histogram and color space representation associated therewith, one or more color space conversion (e.g., as discussed herein) can be performed with respect to the color space (and color space distribution) of the one or more fiducial markers 741, 742, and can be performed to optimize detection of the one or more markers in relation to the environmental changes.

In various embodiments, the one or more fiducial markers 741, 742 can provide both relational and location information by having the mesh encoded in the one or more fiducial markers, and transmitting the relevant relational and location information to the relevant devices, including the tablet 702, the augmented reality device 773, the camera and/or scanning devices 775, and/or any other suitable devices associated with FIG. 7C. In various embodiments, this is possible at least because the one or more fiducial markers 741, 742 has enhanced data storage capacity as a result of having more channels, e.g., one or more layers with multiple color channels, and/or one or more ultraviolet layers, and/or one or more infrared channels, which allows a mesh with increased informational capacity to be encoded therein and used as suitable required. In various embodiments, the mesh can include one or more objects in the environment and/or the entire environment with all associated objects and entities therein, and in various embodiments, the mesh can include a skin that covers the mesh. In various embodiments, the one or more fiducial markers can include a mesh representing one or more objects in the environment, including, in various embodiments, all of the objects and entities in the environment and a skin associated with the mesh, in addition to providing relational information between the fiducial marker and/or one or more objects, e.g., the tablet 702, the augmented reality device 773, the camera and/or scanning devices 775. The enhanced data storage capacity of the one or more fiducial markers provide an enhanced operation for the overall system 700C at least by increasing the communication efficiency between the various devices, including the tablet 702, the augmented reality device 773, the camera and/or scanning devices 775, and by ensuring the mesh is not interrupted and affecting the user experience associated with 700C.

In various embodiments, one or more devices of system 700C, including the tablet 702, can provide or transmit the relational and/or locational data to the one or more fiducial markers 741, 742, and in various embodiments, where the layout of the environment 701 is known, the information of the location and/or relational information of the various objects and entities associated therewith (including other fiducial markers) can be pre-uploaded therein and updated using one or more techniques as discussed herein. In various embodiments, where a LAB color space is used, the "A" and "B" channels of the LAB space can be encoded with the relevant relational and/or location information utilizing one or more techniques as discussed herein.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

FIG. 8A illustrates one embodiment of a logic flow 800A. The logic flow 800A may be representative of some or all of the operations executed by one or more embodiments described herein.

In the illustrated embodiment shown in FIG. 8A, the logic flow 800A receives a representative dataset of a target, such as an entity, object, or environment at block 802. For example, the logic flow 800A may receive a representative dataset containing at least one of i) one or more images of a target and ii) one or more videos of the target, the target including at least one of i) an environment (and/or each segment 193 thereof), ii) a live entity and iii) an object using any suitable camera or scanning device, where the representative dataset is contained in image group model data 450 or obtained directly by scanning the target using any suitable device, e.g., camera or video device 195 and/or scanning device 197. In various embodiments, the target may be an environment that contains a scannable image therein. Similarly, the target may be one or more segments of the environment.

The logic flow 800A may process the representative dataset into a suitable representation of a color scheme, such as a histogram, at block 804. For example, the logic flow 800A may examine image group model data 450, which contains captured data of a scanned environment. Once the logic flow 800A identifies the scanned data of the environment, the logic flow can process that data into a histogram of a particular color space, e.g., an RGB color space. A histogram may be generated for each segment 193 of the environment.

The logic flow 800A may identify the most prevalent colors of the environment utilizing each generated histogram at block 806. In various embodiments, the logic flow identifies the most prevalent colors in order to apply a color space transform mechanism for substantially maximizing edge detection for a scannable image, such as a matrix, matrix barcode, fiducial marker, etc. based on the location in an environment.

The logic flow 800A may determine, for each segment 193 of the environment, a related number of colors based on the histogram at block 808, e.g., the histogram is used to map to a first color space, where least prevalent and/or absent colors in relation to the most prevalent colors of the target are determined, and the least prevalent and/or absent colors form the basis for one or more color channels in a second color space.

In various embodiments, the related plurality of colors can represent a range of colors between the most prevalent colors and the least prevalent colors and/or absent colors of the target, including sole colors that are absent in relation to the target and/or colors that are the least prevalent in association with the target. In various embodiments, in order to determine the related number of colors based, the logic flow may select and apply a color space transform mechanism to the image data associated with the histogram. As described herein, the image data includes color data configured in accordance with a color space model, e.g., the histogram can be used to create a color space representation of the target data. In some embodiments, the logic flow 800A applies the color space transform mechanism 180 of FIG. 1 by converting the image data into transformed image data comprising color data in accordance with another color space model that differs from the color space associated with the histogram. For example, the logic flow may create a histogram of the image data associated with the target, then use the histogram to create a first color space representation of the target, e.g., an RGB color space representation. Thereafter, as discussed below, the logic flow can perform one or more additional color space transformation techniques into other color spaces, such as XYZ color spaces or any other suitable color space that utilizes a tristimulus system.

In various embodiments, the logic flow 800A may perform a color space transform manipulating the color data of the original image data to enable efficient edge detection on the transformed image data. As explained below, the logic flow 800A may change the color space model to quickly identify boundaries, such as when two colors are close in proximity. The logic flow 800A examines each datapoint in the image, and for each location, the logic flow 800A identifies a color. In various embodiments, the color space conversion can be based on at least one set of color coordinates for each one of the most prevalent colors according to the another (or second) color space and determining at least one set of color coordinates corresponding to the related plurality of colors in the (second) another color space, where the at least one set of coordinates of the most prevalent plurality of colors being either one or both of perpendicular/orthogonal and a maximal distance away, with respect to another color space, to the at least one set of coordinates of the related colors. In various embodiments, the second color space can be considered a derivative color space of the first color space.

In various embodiments, this ensures that the colors used for a scannable image may maximize edge detection, as the maximal distance away between prevalent color channels and colors of the target in the environment and other color channels and colors (the related color channels and colors) ensures that the related color channels and colors are either absent in the target and/or least prevalent in the target. Additionally, if the related colors and color channels are selected to be perpendicular or orthogonal in relation to the target color channels and colors (and with respect to one another), this may further enhance edge detection.

In one example utilizing the one or more techniques outlined above, the logic flow 800A proceeds to identify two or more colors by prevalence in the target and configures them into one channel. Take, for instance, a first color and second color of first and second highest prevalence, respectively, where the first color becomes a minimum in the color channel and the second color becomes the maximum such that the boundary may be a transition between these colors. This boundary may be at least one pixel where the color changed from the first to the second color or vice versa. If the first color is set to zero (0) and the second color is set to two hundred and fifty-five (255), then, mathematically, this boundary may be located at pixel(s) that jumped between the minimum and maximum value; for example, there may be sharp division (i.e., thin boundary) in which at least two neighboring pixels transition immediately between 0 and 255.

As alluded to above, for a given segment 193, the color channels can correspond to a first color space, e.g., RGB, where the first color space can be based on the first set of tristimulus values, and where the first-color space may have a color coordinates for representing colors of the target, e.g., the most prevalent colors of the target. The logic flow 800A may then identify one or more colors that are either unused or barely used (i.e., least prevalent or absent) and establish those colors in another channel to be opposite of the above-identified prevalent colors, where the new color channel (or color channels) forms the basis for a new color space, e.g., a new set of tristimulus values of an XYZ color space, and where the first color space is converted to the second color space.

Then, the logic flow 800A may perform one or more additional operations, e.g., configuring each color channel of the new color space to be perpendicular or orthogonal to one another in the new color space model, make an additional conversion to a third color space, including an intermediary operation that filters out non-chromacity related features such as luminance or brightness channel, and/or perform an orientation operation in the second (or third) color space prior to making the color channels perpendicular or orthogonal to each other (in order to maximize the distance between color channels and thus enhancing edge detection).

At block 810, the logic flow 800A may utilize the related colors of block 808 to create one or more scannable images, such as a matrix, matrix barcode, fiducial marker, or any other suitable image for scanning. In various embodiments, the related colors may be colors of each color channel associated with the final color space conversion as discussed above, e.g., a plurality of color channels and associated colors, as may be represented in an XYZ color space, that are either not prevalent in the target and/or are completely absent in the target, where, in various embodiments, the least prevalent and/or absent colors can be arranged orthogonally to each other to further enhance edge detection. In various embodiments, the scannable image may be a matrix barcode that is formed to reflect colors of each of the least prevalent and/or absent and/or orthogonal color channels in relation to a target, e.g., a segment 193 of the environment containing the matrix barcode.

In various embodiments, the matrix barcode is embedded with information that is based on the color space conversions, e.g., each pixel or pixels associated with the matrix bar code is associated with a color channel of the final color space, e.g., the XYZ color space with color channels representing the least prevalent or absent colors of the environment, where each color channel represents a bit of data, and where the number of color channels can be three or more, four or more, etc. (as there are no limitations imposed by human perceptibility), and by extension the number of encoded bits can be three or more, four or more, etc.

In various embodiments, where four or more colors are used, each one of the four or more colors are distinct colors in relation to one another, and based on the color space techniques discussed herein and above, the four or more colors are derived from a plurality of coordinates corresponding to each one of the at least four distinct colors along a converted-to (derivative) color space, where the converted-to (derivative) color space contains a plurality of coordinates sets representing the at least four prevalent colors of the target, e.g., environment, and each of the four or more colors corresponds to a distinct coordinate set of the converted-to (derivative) color space.

In various embodiments, each of the four or more distinct colors are selected based on having a maximal opposite coordinate relationship with respect to at least one of the plurality of coordinate sets representing at least four prevalent colors in the target, e.g., environment.

There are a number of applicable edge detection techniques, and the edge detection technique 190 may be appropriate for the one color space model of the transformed image data while another edge detection technique may be appropriate for the original color space model. The embodiments are not limited to this example.

FIG. 8B illustrates one embodiment of a logic flow 800B. The logic flow 800B may be representative of some or all of the operations executed by one or more embodiments described herein.

In the illustrated embodiment shown in FIG. 8B, at block 815, the logic flow may detect a matrix that includes one or more non-black and non-white colors, where each of the non-black and non-white colors is i) at least one of an absent color in relation to an environment and/or segment 193 thereof and/or ii) at least one least prevalent color associated with the environment and/or segment 193 thereof. In various embodiments, the matrix is a barcode constructed with one or more color space conversion techniques as outlined herein, e.g., the matrix barcode is derived from an RGB color space and a derivative color space of the RGB color space (a converted-to (derivative) color space from the RGB color space, such as an XYZ color space). In various embodiments, the derivative color space is an XYZ color space with a filtered luminance channel.

In various embodiments, the barcode can be scanned with any suitable component, e.g., a scanning device 197, that has a suitable key, e.g., tristimulus equations associated with a conversion to an XYZ color space, that reveals the color channels with associated colors that are associated with the scannable portions of the matrix barcode, including, in various embodiments, information encoded in the matrix barcode. In various embodiments, the barcode can include four or more distinct colors each associated with at least four distinct color channels, where each of the colors is different from one another and different from the most prevalent colors of the environment and/or segment 193 thereof. In various embodiments, the colors and color channels of the barcode can be computed according to coordinate relationships between the most prevalent colors and the least prevalent and/or absent colors in the derivative color space, including a maximal distance between the most prevalent colors and the least prevalent and/or absent colors. Additional or different color space conversion techniques can be used as discussed herein, and this is merely one example consistent with the present disclosure.

In various embodiments, the barcode can be printed and/or embedded on a physical medium, e.g., a physical surface or material, using any suitable component, e.g., printing device 199, with the least prevalent and/or absent colors, and the barcode can be scanned along the surface of the physical surface. In other embodiments, any suitable computer device, including a computer, laptop, or tablet (as shown in FIG. 7A provided for below) can be configured to generate a scannable barcode that reflects the least prevalent or absent colors, where the barcode can be scanned along a surface of the computer display.

At block 820, the logic flow 800B may transmit the result of the scan to any suitable computer device as discussed herein, including an indication as to whether or not the scan was of the barcode was successful, and any encoded information associated therewith was obtained.

Figure 8C:
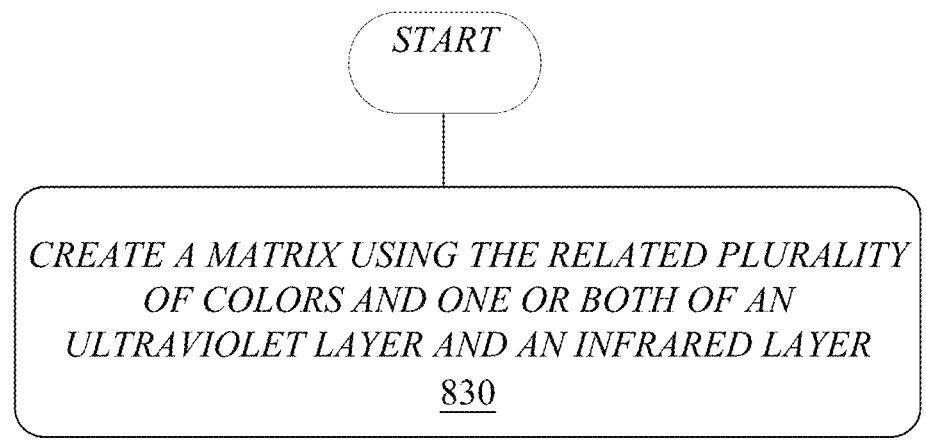

FIG. 8C illustrates one embodiment of a logic flow 800C. The logic flow may be representative of some or all of the operations executed by one or more embodiments described herein.

The logic flow 800C may utilize the related colors to produce a scannable image at block 830, such as a matrix, matrix barcode, fiducial marker, or any other suitable image for scanning, where the scannable image can, in addition to including non-black and non-white colors (such as the least prevalent and/or absent colors associated with a target, e.g., an environment), can include one or both of an ultraviolet layer and an infrared layer. In various embodiments, the matrix, matrix barcode, fiducial marker, or any other suitable image can be printed and/or embedded on a physical surface using any suitable component, e.g., printing device 199, with the least prevalent and/or absent colors and an infrared and/or ultraviolet layer, and the barcode can be scanned along the surface of the physical surface. In other embodiments, any suitable computer device, including a computer, laptop, or tablet (as shown in FIG. 7A provided for below) can be configured to generate a scannable barcode that reflects the least prevalent or absent colors, the ultraviolet layer and/or the infrared layer, where the matrix, matrix barcode, fiducial marker, or any other suitable image can be scanned along a surface of the computer display.

In various embodiments, the ultraviolet layer may be printed first along the physical surface and/or may form the top layer generated on a computer screen in order to maximize the benefits associated with ultraviolet light. In various embodiments, the colors of the scannable image need not be colors that have a relationship with the environment and/or not based on color space conversion techniques and can be any colors, including standard black and white colors, with a scannable image containing both an infrared and ultraviolet layer for detection.

FIG. 8D illustrates one embodiment of a logic flow 800D. The logic flow 800D may be representative of some or all of the operations executed by one or more embodiments described herein.

In the illustrated embodiment shown in FIG. 8D, at block 840, the logic flow 800D may detect a scannable image, e.g., a matrix, that includes one or more non-black and non-white colors, where each of the non-black and non-white colors are at least one of an i) an absent color in relation to an environment and/or segment 193 thereof and/or ii) a least prevalent color associated with the environment and/or segment 193 thereof, in addition to one or both of an ultraviolet layer and/or an infrared layer. In various embodiments, the matrix is a barcode constructed with one or more color space conversion techniques as outlined herein, e.g., as discussed with respect to FIG. 8B, with the addition of an ultraviolet layer and/or infrared layer.

In various embodiments, the scannable image, e.g., barcode, can be scanned with any suitable component, e.g., a scanning device 197, that has a suitable key, e.g., tristimulus equations associated with a conversion to an XYZ color space, that reveals the color channels with associated colors that are associated with the scannable portions of the matrix barcode, including, in various embodiments, information encoded in the matrix barcode. In addition to the key, any suitable component, e.g., scanning device 197, can also have a verification bit indicating whether the ultraviolet layer and/or infrared layer is associated with information, and if so, performs the scan and/or decodes the information based on the verification bit. In various embodiments, the barcode can include four or more distinct colors each associated with at least four distinct color channels, where each of the colors are different from one another and different to the most prevalent colors of the environment, in addition to also having one or both the ultraviolet layer and/or the infrared layer, and as such, the scan can be a scan of six or more bits of information.

In various embodiments, the barcode can be printed and/or embedded on a physical surface using any suitable component, e.g., printing device 199, with the least prevalent and/or absent colors, and the barcode can be scanned along the surface of the physical surface. In other embodiments, any suitable computing device, including a computer, laptop, or tablet (as shown in FIG. 7A provided for below) can be configured to generate a scannable barcode that reflects the least prevalent or absent colors, where the barcode can be scanned along a surface of the computer display. In various embodiments, the printing of the scannable image, e.g., barcode, can be such that the topmost layer may be an ultraviolet layer and any associated scan may account for the ultraviolet layer first. Similarly, in various embodiments, if the scannable image is generated by a computer device and displayed by a computer display, the first layer displayed by the computer device can be the ultraviolet layer.

At block 850, the logic flow 800D may transmit the result of the scan to any suitable computer device as discussed herein, including an indication as to whether or not the scan was of the barcode was successful, and any encoded information associated in addition to that was obtained.

FIG. 8E illustrates one embodiment of a logic flow 800E. The logic flow 800E may be representative of some or all of the operations executed by one or more embodiments described herein, including but not limited to FIG. 1 and/or FIG. 7C.

At block 860, the logic flow 800E may detect an alteration to a fiducial marker on display of a device, where the fiducial marker includes a plurality of non-black and non-white colors, wherein each one of the plurality of non-black and non-white colors are based on a detected change in color with respect to a change in an environment, and where each one of the non-black and non-white colors are based on at least one of i) an absent color in relation to the changed environment and/or segment 193 thereof and ii) at least one least prevalent color associated with the changed environment and/or segment 193 thereof. The fiducial marker may be displayed and utilized as discussed with reference to FIG. 1 and FIG. 7B and utilizing any color space optimization technique as discussed herein, including but not limited to as discussed with reference to FIG. 3. For example, a camera or scanning device may detect a chance in a color space of an environment containing the device with the display and transmit the image data associated with the change in the color space of the environment to the device displaying the fiducial marker, such as a computer device, laptop, or tablet system. The computer device, laptop, or tablet system may perform one or more color space optimization techniques as discussed herein and display an altered fiducial marker that is optimized for detection in the new environment. In various embodiments, as discussed elsewhere herein with reference to other images, the fiducial marker may include at least four distinct colors, each of the four colors being different with respect to one another and/or also being different to each one of the most prevalent plurality of colors of the altered environment, where the altered environment may include at least four prevalent colors, and where each one of the at least four distinct colors capable of being derived from a plurality of coordinates corresponding to each one of the at least four distinct colors along a derivative color space associated with a color space conversion in relation to the color space of the altered environment, and where the derivative color space may contain a plurality of coordinates sets representing the at least four prevalent colors. In various embodiments, at least four distinct colors may each correspond to a distinct coordinate set of the derivative color space, and each of the at least four distinct colors may be selected based on having a maximal opposite coordinate relationship with respect to at least one of the plurality of coordinate sets representing the at least four prevalent colors.

In various embodiments, the device performing the color space conversions, such as a computer, laptop, or tablet system may perform a spatial orientation operation (discussed in greater detail with reference to FIG. 7B) utilizing the altered fiducial marker at block 865. Alternatively, in various embodiments (also discussed in greater detail with reference to FIG. 7B), the computer, laptop, or tablet system may transmit the altered fiducial marker to another device, such as an augmented reality device in the changed environment and/or a robot configured to exert a physical action in the changed environment. The robot or augmented reality device may then use the altered fiducial marker is as a point of spatial reference, e.g., the robot or augmented reality device receives the image data associated with the altered fiducial marker and display it on interface it of its own or otherwise reproduces such that another device in the environment, e.g., a camera, scanner, controller, or any other suitable device that the robot or augmented reality device receives data from or otherwise performs a physical action in relation thereto may more easily scan the fiducial marker (which is now optimized for the changed environment), thus allowing the robot or augmented reality device to perform a physical action and/or spatial orientation in relation to the other device providing the data or otherwise communicating with the robot or augmented reality device.

FIG. 8F illustrates one embodiment of a logic flow 800F. The logic flow 800F may be representative of some or all of the operations executed by one or more embodiments described herein including but not limited to FIG. 1 and/or FIG. 7C.

At block 870, the logic flow 800F may detect an alteration to a fiducial marker (or fiducial markers) that is located in an environment, or otherwise associated with the environment, containing an augmented reality device (which can be part of an overall augmented reality system), where the fiducial marker includes a plurality of non-black and non-white colors. In various embodiments, each one of the plurality of non-black and non-white colors are based on a detected change in color with respect to a change in an environment and/or a change in a location in the environment (e.g., from a first segment 193 of the environment to a second segment 193 of the environment). In various embodiments, each one of the non-black and non-white colors are based on at least one of i) an absent color in relation to the changing environment and/or segment 193 thereof or ii) at least one least prevalent color associated with the changing environment and/or segment 193 thereof. The fiducial marker may be displayed and utilized as discussed concerning FIG. 1, FIG. 7B, and/or FIG. 7C, and utilizing any color space optimization technique as discussed herein, including but not limited to as discussed concerning FIG. 2. For example, a camera or scanning device may detect a chance in a color space of an environment containing the device with the display and transmit the image data associated with the change in the color space of the environment to the device displaying the fiducial marker, such as a computer device, laptop, or tablet system. The computer device, laptop or tablet system may perform one or more color space optimization techniques as discussed herein and display an altered fiducial marker that is optimized for detection in the new environment and/or segment 193 thereof.

In various embodiments, as discussed elsewhere herein with reference to other images, the fiducial marker may include at least four distinct colors, each of the four colors being different with respect to one another and/or also being different to each one of the most prevalent plurality of colors of the altered environment, where the altered environment may include at least four prevalent colors, and where each one of the at least four distinct colors capable of being derived from a plurality of coordinates corresponding to each one of the at least four distinct colors along a derivative color space associated with a color space conversion in relation to the color space of the altered environment, and where the derivative color space may contain a plurality of coordinates sets representing the at least four prevalent colors. In various embodiments, at least four distinct colors may each correspond to a distinct coordinate set of the derivative color space, and each of the at least four distinct colors may be selected based on having a maximal opposite coordinate relationship with respect to at least one of the plurality of coordinate sets representing the at least four prevalent colors.

In various embodiments, more than one color space conversion can take place, where the first color space conversion, e.g., from RGB to XYZ, performs the necessary operations to optimize the color space to be associated with each fiducial marker in relation to the changes in the environment, and where the second conversion, e.g., XYZ to LAB, can offer an advantage inherent with respect to that color space in relation to a particular purpose, e.g., updating a mesh for an augmented reality device and performing detection of fiducial markers useful for that purpose in association therewith. The key associated with scanning and/or performing any required associated decryption in relation to the one or more fiducial markers can be defined by the mathematical equations governing the conversion from the first color space to the other color space, e.g., RGB to XYZ, and, as applicable, the conversion of the other color space to another color space, e.g., XYZ to LAB. A mesh can be a three-dimensional representation of one or more objects, surfaces, or other entities in an environment, and the mesh can include a skin that forms the covering associated therewith. In various embodiments, the mesh can be associated with the entirety of an environment and all the objects and entities therein.

In various embodiments, more than one device may project or otherwise produce more than one fiducial marker, and in various embodiments, each fiducial marker can correspond to an object or entity, e.g., user, in an environment. The color space optimization with respect to one of the fiducial markers can be the same or different depending on the application and/or environmental changes.

In various embodiments, one or more devices performing the color space conversions, such as a computer, laptop, camera, scanning device or tablet system may transmit the altered color space to any suitable device, e.g., the computer, the laptop, the camera, the scanning device or the tablet system to update the one or more fiducial markers.

The logic flow can update a mesh for an augmented reality device part of an augmented reality system utilizing the one or more fiducial markers at block 875. As activity takes place in the environment associated with the augmented reality system and device, the augmented reality device can detect movement by utilizing the fiducial markers for orientation and/or, in instances where the fiducial markers are located on objects or entities (e.g., users) in the environment, by detecting altered locations of the objects in the environment. Since the fiducial markers, pursuant to various environments, have color spaces and associated colors that change based on environmental changes, e.g., making the color spaces of the markers more detectable by changing the color spaces of the fiducial markers, e.g., optimizing the fiducial markers for detection or scanning in relation to the environment (and associated changes) (e.g., utilizing any suitable color space conversion or image processing technique as discussed herein), the accuracy and sustainability of the mesh is enhanced, and the user experience associated with the augmented reality device and system is, by extension, also enhanced.

FIG. 8G illustrates one embodiment of a logic flow 800G. The logic flow 800G may be representative of some or all of the operations executed by one or more embodiments described herein, including but not limited to FIG. 1 and/or FIG. 7C.

At block 880, the logic flow 800G may utilize one or more fiducial markers contained in an environment associated with an augmented reality system to localize one or more cameras in the environment for detection and utilization in one or more augmented reality operations. In various embodiments, the one or more fiducial markers can be any marker as described herein, including markers with color channels, ultraviolet channels, and/or infrared channels as optimized for detection as discussed herein. In various embodiments, the one or more fiducial markers can be pre-encoded with the layout of the environment, including but not limited to all objects and entities therein, e.g., cameras, machines, computers, objects, people etc. In various embodiments, the location (e.g., where each object, entity, and/or device of the environment is located) and relational data (e.g., the relation of one object to another, including the fiducial markers themselves) can be transmitted to the one or more fiducial markers in real time by the one or more cameras, other scanning devices, and/or computer devices in the environment, which can include updating a pre-configured marker and/or encoding data on a fiducial marker without data.

In various embodiments, at block 882, the logic flow 800G can utilize the encoded data to determine the layout and location for one or more augmented reality meshes (and skin(s) associated therewith) is to be generated in relation to one or more objects, entities, and/or devices in the environment, including a mesh layout for the environment as a whole. In various embodiments, this can include updating an existing mesh based on detected alterations to the environment, where the detection of a change to the environment can be pursuant to any technique as discussed herein or as otherwise suitable at block 884. In various embodiments, this can include utilizing one or more camera or scanning devices to detect a rotation, movement, or other alteration of an entity, object, or device in the environment, and transmit the detection to the one or more alteration to the one or more fiducial markers, which can update the location and/or relational data as data represented by having one or more dynamically optimized-for-detection color layers, ultraviolet layers, and/or infrared layers, and where those dynamically optimized layers can be pursuant to any of the optimization techniques discussed herein or as otherwise suitable. Once the one or more fiducial markers have been encoded and/or updated, the augmented reality system can generate or update the mesh associated with the one or more objects, entities, and/or devices of the environment, where in various embodiments this can include a generated or updated mesh (and associated skin) for the layout of the environment as a whole at block 886. In various embodiments, the relational and/or location data can be encoded in one or more color channels associated with the one or more fiducial markers. In various embodiments, this can include an "A" and/or a "B" channel of a LAB color space, where in various embodiments, the colors associated with the one or more fiducial markers are generated and updated pursuant to one or more color space conversion techniques as discussed herein.

Figure 8H:
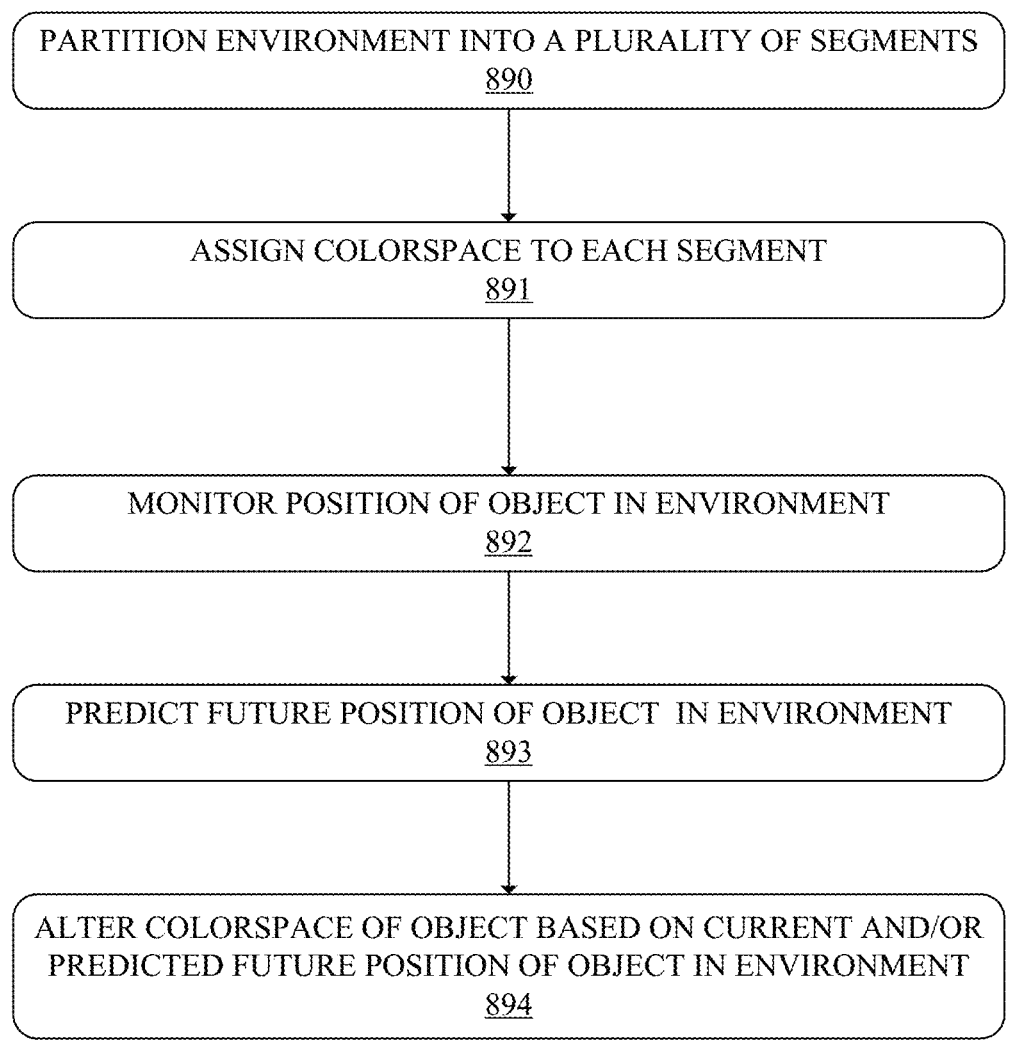

FIG. 8H illustrates one embodiment of a logic flow 800H. The logic flow 800H may be representative of some or all of the operations executed by one or more embodiments described herein, including but not limited to FIG. 1 and/or FIG. 7C.

As shown, the logic flow 800H begins at block 890, where an environment (e.g., a room, portion of a room, floor of a building, the environment 701, etc., is partitioned into a plurality of segments 193. Generally, a scanner and/or camera device may provide one or more images depicting the environment. The environment analysis and prediction logic 191 may then analyze the image(s) to partition the environment into a plurality of segments. For example, a grid structure may be used to partition a room into any number of grid segments, e.g., 4, 8, 16, etc. grid segments. As another example, when multiple cameras and/or scanning devices are available to provide images, the images may be used to generate a 3-D image of the room, and an octree structure may be used to generate the plurality of segments in three dimensions.

At block 891, an optimal color space may be determined for each segment 193 of the environment generated at block 890 according to the color space optimization techniques described herein. The optimal color space may be associated with each segment 193. At block 892, the position of an object displayed in the environment may be monitored by the environment analysis and prediction logic 191. The object may be, for example, a matrix, a matrix barcode, and/or a fiducial marker. The object displayed may have a first color space corresponding to a first segment 193 of the environment. At block 893, the environment analysis and prediction logic 191 may predict a future position of the object based on a movement of the object in the environment. The predicted future position may comprise a different segment 193, such as a second segment 193, of the environment. At block 894, the color space of the object may be altered based on the predicted future position of the object in the environment. For example, the color space of the object may be modified to have optimal color space of the second segment 193 of the environment. The optimal color spaces may be determined based on one or more techniques described herein, e.g., FIGS. 2-3, and/or the logic flow 800A. In some embodiments, a linear transform may be applied to smooth the transition from the color space of the first segment 193 of the environment to the color space of the second segment 193 of the environment. In some embodiments, the color spaces of the first and second segments 193 are different color spaces. By altering the color space of the object, detection of the object in the second segment of the environment may be maximized. The color space of the second segment of the environment may include a plurality of non-black, non-white colors, and non-greyscale colors.

Figure 8I:
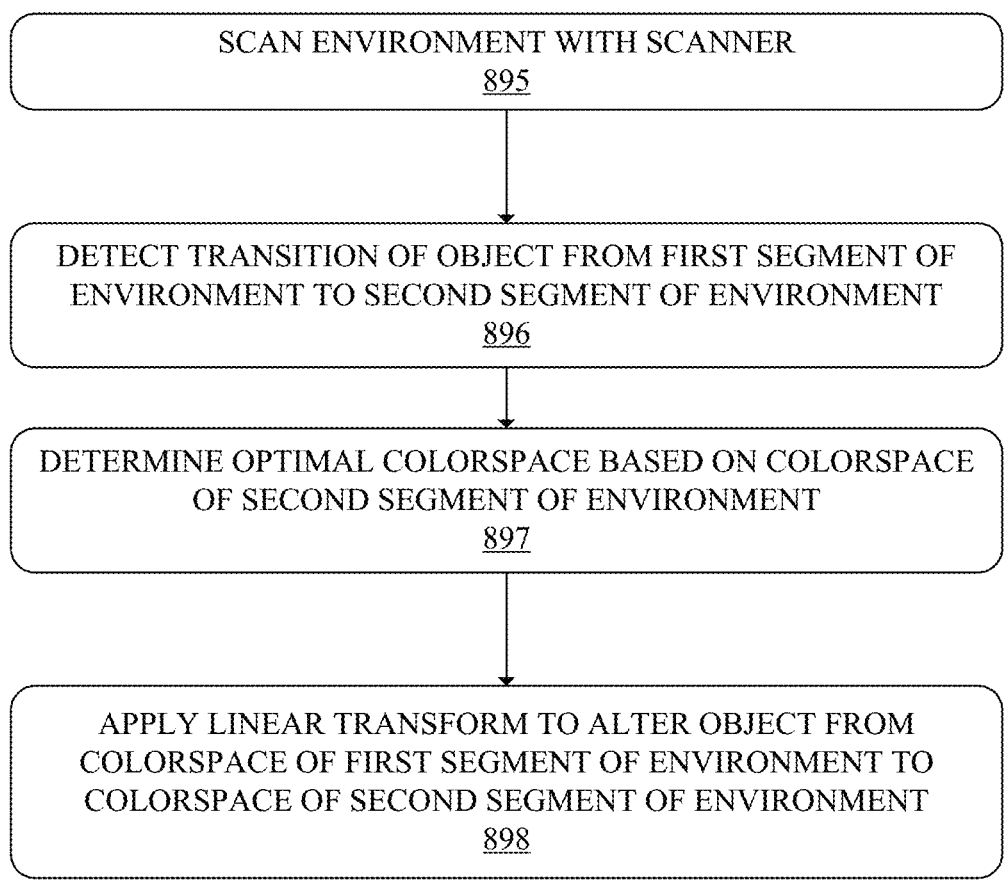

FIG. 8I illustrates one embodiment of a logic flow 800I. The logic flow 800I may be representative of some or all of the operations executed by one or more embodiments described herein, including but not limited to FIG. 1 and/or FIG. 7C.

At block 895, a scanner and/or camera device may scan an environment (e.g., a room, the environment 701, etc.) to capture one or more images of the environment. At block 896, the environment analysis and prediction logic 191 determines that an object has transitioned from a first segment 193 of the environment to a second segment 193 of the environment based on the captured images. At block 897, an optimal color space associated with the second segment of the environment is determined. The optimal color space may be predetermined and/or determined responsive to the transition at block 896. The optimal color space may be determined based on one or more techniques described herein, e.g., FIGS. 2-3, and/or the logic flow 800A. At block 898, a linear transform is applied to alter a color space of the object from the color space of the first segment of the environment to the color space of the second segment of the environment. By altering the color space of the object, detection of the object in the second segment of the environment may be maximized. The color space of the second segment of the environment may include a plurality of non-black, non-white colors, and non-greyscale colors.

Figure 9:
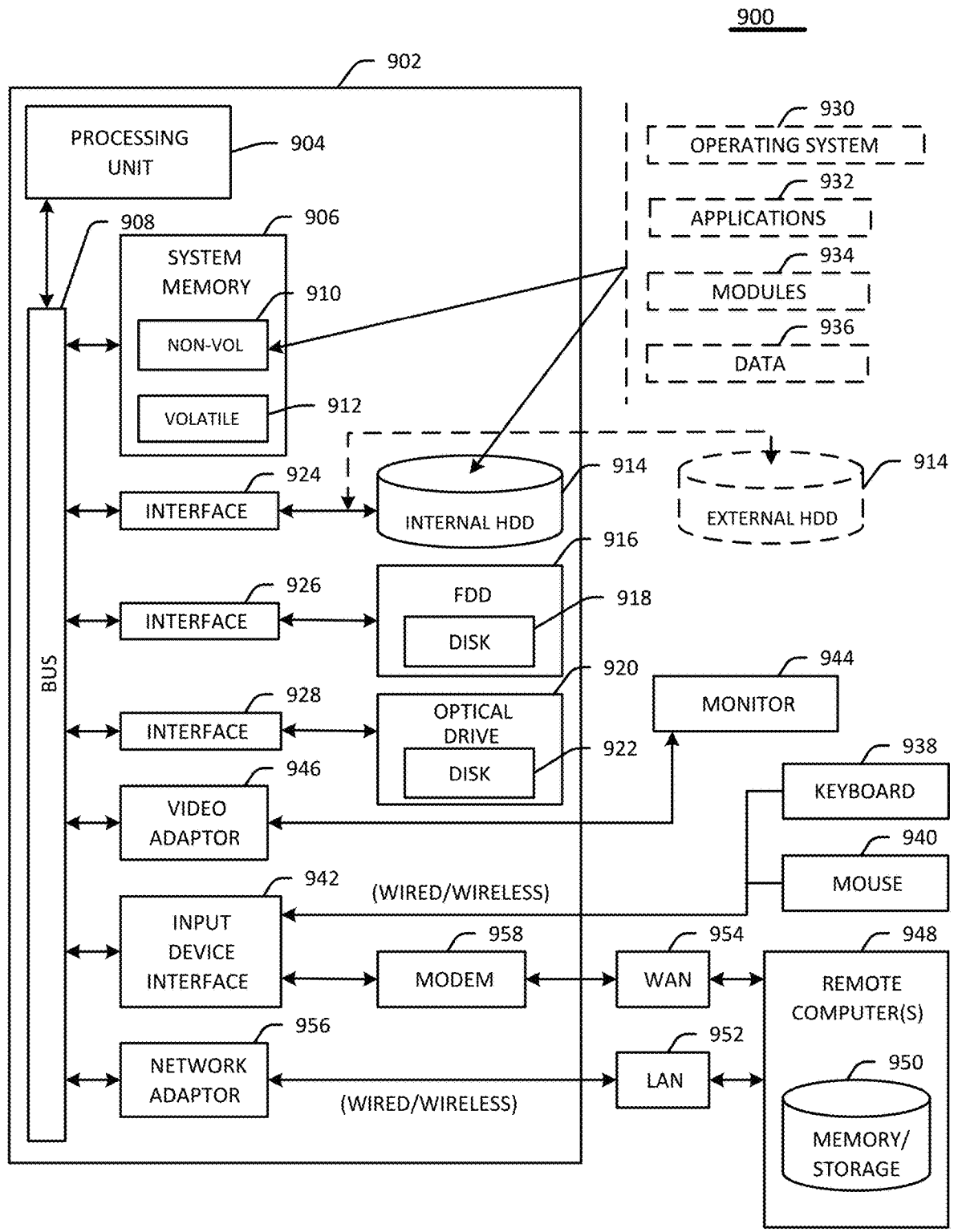
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIGS. 1, 4-5, 7A-7C, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908 but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It may be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
determining, by a processor, that an object is located in a first segment of a plurality of segments of an environment at a first time interval;
determining, by the processor, that the object is in a second segment of the plurality of segments at a second time interval, the second time interval subsequent to the first time interval;
determining, by the processor, an altered color space of the object based on a color space of the second segment of the environment; and
detecting, by the processor, the object based on the altered color space of the object.

2. The method of claim 1, wherein each segment of the environment is associated with a respective distinct color space, wherein a color space of the object at the first time interval is based on the color space of the first segment.

3. The method of claim 1, wherein the determination that the object is in the second segment is based on detected movement of the object in the environment.

4. The method of claim 1, further comprising:
performing, by the processor, a spatial orientation operation based on the detection of the object.

5. The method of claim 1, further comprising:
updating, by the processor, an augmented reality mesh operation based on the detection of the object.

6. The method of claim 1, wherein the altered color space of the object is based at least in part on a linear transform of a color space of the first segment of the environment and the color space of the second segment of the environment.

7. The method of claim 1, wherein the plurality of segments are represented based on an octree structure or a quadtree structure.

8. The method of claim 1, wherein the object comprises a matrix code.

9. A non-transitory computer-readable storage medium, the computer-readable storage medium including instructions that when executed by a processor, cause the processor to:
determine that an object is located in a first segment of a plurality of segments of an environment at a first time interval;
determine that the object is in a second segment of the plurality of segments at a second time interval, the second time interval subsequent to the first time interval;
determine an altered color space of the object based on a color space of the second segment of the environment; and
detect the object based on the altered color space of the object.

10. The computer-readable storage medium of claim 9, wherein each segment of the environment is associated with a respective distinct color space, wherein a color space of the object at the first time interval is based on the color space of the first segment.

11. The computer-readable storage medium of claim 9, wherein the determination that the object is in the second segment is based on detected movement of the object in the environment.

12. The computer-readable storage medium of claim 9, wherein the instructions further configure the processor to:
perform a spatial orientation operation based on the detection of the object.

13. The computer-readable storage medium of claim 9, wherein the instructions further configure the processor to:
update an augmented reality mesh operation based on the detection of the object.

14. The computer-readable storage medium of claim 9, wherein the altered color space of the object is based at least in part on a linear transform of a color space of the first segment of the environment and the color space of the second segment of the environment.

15. The computer-readable storage medium of claim 9, wherein the plurality of segments are represented based on an octree structure or a quadtree structure.

16. The computer-readable storage medium of claim 9, wherein the object comprises a matrix code.

17. An apparatus, comprising:
a processor; and
a memory storing instructions which when executed by the processor cause the processor to:
determine that an object is located in a first segment of a plurality of segments of an environment at a first time interval;
determine that the object is in a second segment of the plurality of segments at a second time interval, the second time interval subsequent to the first time interval;
determine an altered color space of the object based on a color space of the second segment of the environment; and
detect the object based on the altered color space of the object.

18. The apparatus of claim 17, wherein each segment of the environment is associated with a respective distinct color space, wherein a color space of the object at the first time interval is based on the color space of the first segment.

19. The apparatus of claim 17, wherein the determination that the object is in the second segment is based on detected movement of the object in the environment.

20. The apparatus of claim 17, wherein the instructions further cause the processor to:
perform a spatial orientation operation based on the detection of the object.

* * * * *